US007822264B2

(12) United States Patent
Balslev et al.

(10) Patent No.: US 7,822,264 B2
(45) Date of Patent: Oct. 26, 2010

(54) COMPUTER-VISION SYSTEM FOR CLASSIFICATION AND SPATIAL LOCALIZATION OF BOUNDED 3D-OBJECTS

(75) Inventors: Ivar Balslev, Odense (DK); Rene Dencke Eriksen, Odense (DK)

(73) Assignee: Scape A/S, Copenhagen (DK)

( * ) Notice: Subject to any disclaimer, the term of this patent is extended or adjusted under 35 U.S.C. 154(b) by 1043 days.

(21) Appl. No.: 10/568,268

(22) PCT Filed: Aug. 13, 2004

(86) PCT No.: PCT/DK2004/000540

§ 371 (c)(1),
(2), (4) Date: Aug. 15, 2006

(87) PCT Pub. No.: WO2005/017820

PCT Pub. Date: Feb. 24, 2005

(65) Prior Publication Data

US 2007/0127816 A1    Jun. 7, 2007

(30) Foreign Application Priority Data

Aug. 15, 2003    (DK)    ............................... 2003 01178

(51) Int. Cl.
*G06K 9/00*    (2006.01)
(52) U.S. Cl. .................................................. 382/154
(58) Field of Classification Search ................. 382/199, 382/154; 358/296; 318/568.13, 568.15; 292/175; 700/262, 245, 259; 414/416.01; 356/601; 345/419
See application file for complete search history.

(56) References Cited

U.S. PATENT DOCUMENTS 4,183,013 A * 1/1980 Agrawala et al. ........... 382/173

(Continued)

FOREIGN PATENT DOCUMENTS

EP    0 220 467    12/1989

(Continued)

OTHER PUBLICATIONS

Projective Transformations, website http://www.ipb.uni-bonn.de/DAGM/Tutorials2001/Session-2/img0.htm, Jun. 15, 2006 in 12 pages.

(Continued)

*Primary Examiner*—Daniel G Mariam
*Assistant Examiner*—Aklilu k Woldemariam
(74) *Attorney, Agent, or Firm*—Knobbe Martens Olson & Bear LLP

(57) ABSTRACT

The invention relates to a system and method for recognition, classification and spatial localization of bounded 3D-objects. In particular it relates to a computerized method for recognition, classification and localization of objects. The method comprises generation of a training database based on a large number of training views recorded by a camera or constructed using a CAD representation of an object. Characteristic curves are derived from the training views, and primitives of the curves are detected. Intrinsic and extrinsic descriptors of features are stored in the database together with data about the object class and pose of the view. Finally the recognition takes place in two stages: First the intrinsic descriptors of the recognition view are compared with those of the database. Second, among the best matching features it is explored which features agree mutually in the sense that they suggest the same object class at the same pose.

38 Claims, 16 Drawing Sheets

U.S. PATENT DOCUMENTS

| | | | |
|---|---|---|---|
| 4,566,124 A * | 1/1986 | Yamamoto et al. | 382/185 |
| 4,712,248 A | 12/1987 | Hongo | |
| 4,748,675 A * | 5/1988 | Suzuki et al. | 382/197 |
| 4,899,095 A | 2/1990 | Kishi et al. | |
| 4,969,201 A * | 11/1990 | Takasaki et al. | 382/199 |
| 5,351,310 A | 9/1994 | Califano et al. | |
| 5,471,312 A | 11/1995 | Watanabe et al. | |
| 5,572,103 A | 11/1996 | Terada | |
| 5,828,769 A | 10/1998 | Burns | |
| 5,959,425 A | 9/1999 | Bieman et al. | |
| 6,236,896 B1 | 5/2001 | Watanabe et al. | |
| 6,266,054 B1 * | 7/2001 | Lawton et al. | 345/581 |
| 6,328,523 B1 | 12/2001 | Watanabe et al. | |
| 6,501,554 B1 | 12/2002 | Hackney et al. | |
| 6,597,971 B2 | 7/2003 | Kanno | |
| 6,665,588 B2 | 12/2003 | Watanabe et al. | |
| 2003/0179824 A1 * | 9/2003 | Kan et al. | 375/240.1 |

FOREIGN PATENT DOCUMENTS

| | | |
|---|---|---|
| EP | 1 262 907 A1 | 4/2002 |
| JP | 60-204086 | 10/1985 |
| JP | 08-136220 A | 5/1996 |
| JP | 2002-197472 | 7/2000 |
| JP | 2002286426 A | 10/2002 |
| JP | 2002286426 A | 10/2002 |
| WO | WO 91/05314 | 4/1991 |
| WO | WO 95/16252 | 6/1995 |

OTHER PUBLICATIONS

Assignment 1: 2D Homograph, website http://www.cs.unc.edu/~salomon/class_projects/COMP%20290-089/Assignment1/, Jun. 15, 2006, in 5 pages.

Candocia, Frank M., *Simultaneous Homographic and Comparametric Alignment of Multiple Exposure-Adjusted Pictures of the Same Scene*, IEEE Transactions on Image Processing, vol. 12, No. 12, Dec. 2003, pp. 1485-1494.

Visintini, Domenico, *High-Efficiency Building Surveys by Dynamic and Static Digital Images oriented with "Mixed Models"*, The International Archives of the Photogrammetry, Remote Sensing and Spatial Information Sciences, vol. XXXIV, Part 5/W12, pp. 335-340.

* cited by examiner

 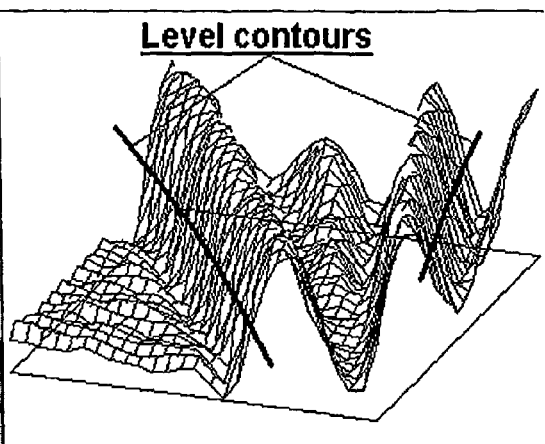
Fig. 15a        Fig. 15b
Fig. 15

Fig. 17

Table A - Structure of the database of descriptors derived from training images

| | Intrinsic descriptors Λ | | | Extrinsic descriptors | | | |
|---|---|---|---|---|---|---|---|
| | ..... | ..... | ..... | ref.point | ref.point | ref. dir | |
| Training image 1 $p_i,\varphi_j,\theta_k$ | | | | $u_Q$ | $v_Q$ | $\gamma$ | $\Pi_{1,1}$ $\Pi_{1,2}$ |
| Training image 2 $p_i,\varphi_j,\theta_k$ +1 | | | | | | | $\Pi_{2,1}$ $\Pi_{2,2}$ |
| | ....... | ..... | ..... | .... | .... | .... | |

Fig. 18

Table B – Structure of descriptors derived from a recognition image

| Intrinsic descriptors Λ | | | Extrinsic descriptors | | | |
|---|---|---|---|---|---|---|
| | | | $u_Q$ | $v_Q$ | $\gamma$ | $\pi_1$ $\pi_2$ |
| | | | | | | |

COMPUTER-VISION SYSTEM FOR CLASSIFICATION AND SPATIAL LOCALIZATION OF BOUNDED 3D-OBJECTS

CROSS REFERENCE TO RELATED APPLICATION

This application claims priority to and is a U.S. National Phase of PCT International Application Number PCT/DK2004/000540, filed on Aug. 13, 2004, designating the United States of America and published in the English language, which claims priority under 35 U.S.C. §119 to Denmark Patent Application Number PA 2003 01178 filed on Aug. 15, 2003. The disclosures of the above-described applications are hereby incorporated by reference in their entirety.

FIELD OF THE INVENTION

The invention relates to a method for object recognition in a computer vision system, more specifically the method relates to classification and spatial localization of bounded 3D-objects.

BACKGROUND OF THE INVENTION

A bottleneck in the automation of production processes is the feeding of components and semi-manufactured articles to automatic systems for machining, assembly, painting, packing etc. Three main types of systems are available today: 1) vibration bowls, 2) fixtures, and 3) computer vision systems. Vibrating bowls are suitable only for components of small dimensions (less than about 5 cm). Fixtures are expensive, since the entire internal storage must be based on such fixtures. Both types of systems must be redesigned and remanufactured when new components are introduced. The computer vision systems developed so far have serious drawbacks. Some systems have unacceptably low processing speeds, others have poor generality. The fast and general systems available today require the objects to lie scattered on a flat conveyer belt, and the object-camera distance must be much larger than the object height. The latter limitation is fundamental for the present systems, as the recognition model used does not include perspective effects in the 3D-2D transformation of the camera. Thus, for parts higher than 5-10 cm, standard computer vision systems demand inconveniently remote cameras. Furthermore, they are not able to guide robots to structured grasping randomly oriented parts piled in boxes and pallets.

Another bottleneck is present when recycled articles are to be classified as they arrive to the recycling plants. The rebuilding of parts used in consumer products, particularly in cars, is expected to increase in the future for environmental and resource reasons. Prior to the rebuilding process there is a need for classification.

A third example of a field with insufficient technology at present is fast navigation of mobile robots In structured environments. The camera based navigation systems require recognition of building elements, stationary furniture etc. Segments of these can be considered to be bounded 3D objects.

Furthermore the system can be used in satellite applications for identification and classification of vehicles, buildings etc.

SUMMARY OF THE INVENTION

According to preferred embodiment of the invention, recognition and/or localization of objects is based on primitives identified in a recognition image of an object. Thus, in a first aspect, the present invention relates to a method of determining contours, preferably level contours and primitives in a digital image, said method comprising the steps of:

- generating the gradients of the digital image;
- finding one or more local maxima of the absolute gradients;
- use the one or more local maxima as seeds for generating contours, the generation of the contours for each seed comprising determining an ordered list of points representing positions in the digital image and belonging to a contour;
- for all of said positions determining the curvature, preferably determined as $d\theta/ds$ preferably pixel units, of the contours;
- from the determined curvatures determine primitives as characteristic points on or segments of the contours.

Based on the primitives derived from training image recognition and/or localization of an object may preferably be performed by a method according to a second aspect of the present invention, which second aspect relates a method of recognition, such as classification and/or localization of three dimensional objects, said one or more objects being imaged so as to provide a recognition image being a two dimensional digital image of the object, said method utilises a database in which numerical descriptors are stored for a number of training images, the numerical descriptors are the intrinsic and extrinsic properties of a feature, said method comprising:

- identifying features, being predefined sets of primitives, for the image
- extracting numerical descriptors of the features, said numerical descriptors being of the two kind:
  - extrinsic properties of the feature, that is the location and orientation of the feature in the image, and
  - intrinsic properties of the feature being derived after a homographic transformation being applied to the feature
- matching said properties with those stored in the database and in case a match is found assign the object corresponding to the properties matched in the database to be similar to the object of the object to be recognised.

In a third aspect the present invention relates to a method of generating a database useful in connection with localising and/or classifying a three dimensional object, said object being imaged so as to provide a two dimensional digital image of the object, said method utilises the method according to the first and/or the second aspect of the invention for determining primitives in the two dimensional digital image of the object, said method comprising:

- identifying features, being predefined sets of primitives, in a number of digital images of one or more object, the images represent different localizations of the one or more object;
- extracting and storing in the database, numerical descriptors of the features, said numerical descriptors being of the two kind:
  - extrinsic properties of the feature, that is the location and orientation of the feature in the image, and
  - intrinsic properties of the feature being derived after a homographic transformation being applied to the feature.

The present invention thus allows for the system to recognize, classify and localize objects.

The invention may furthermore comprise the step of eliminating potential seed points identified near already defined contours. This is done preferably in order to avoid generation of contours that are too close to already existing contours.

Furthermore the generation of the contours may comprise assigning the list of points representing positions in the digital image, each point having a value being assigned to be common with the value of the seed.

Even further the generation of contours may be defined as determining an ordered list of points comprising points following in each point the direction of the maximum gradient.

Even further the generation of the contours may comprise assigning the list of points following in each point the direction of the maximum or minimal gradient detected perpendicular to a contour direction. Which gradient to follow may be decided upon which contour direction that is chosen.

Moreover the generation of the contours may comprise assigning a list of pixels with values being above or below the value of the seed and one or more neighbour pixels with value below or above said value of the seed.

The list of pixels is preferably established by moving through the digital image in a predetermined manner. The established list may be an ordered list of pixels which would enhance the speed of searching the list since a certain value such as a max or min would e.g. be in the top respectively in the bottom of the list. However other solutions may also be applied.

Moreover the contours may be determined from an interpolation based on the list of pixels. This is preferably done in order to obtain a smoother contour.

The creation of a gradient picture may be achieved by determining gradients by calculating the difference between numerical values assigned to neighbouring pixels. In this way a gradient picture is obtained from which further information may be extracted.

The gradients may be stored in an array in which each element preferably corresponds to a specific position in the first image and being a numerical value representing the value of the gradient of the first image's tones in the specific position.

The curvatures which may be used for generating primitives are preferably established as $\kappa = d\theta/ds$ where $\theta$ is the tangent direction at a point on a contour and s is the arc length measured from a reference point.

The primitives mentioned in the first, second and third aspect above preferably comprise of one or more of the following characteristics:
  segments of straight lines,
  segments of relatively large radius circles,
  inflection points,
  points of maximum numerical value of the curvature, said points being preferably assigned to be corners,
  points separating portions of very low and very high numerical value of the curvature, and
  small area entities enclosed by a contour.

The generated contours mentioned above may be searched for one or more of the following primitives:
  inflection point, being a region of or a point on the contour having values of the absolute value of the curvature being higher than a predefined level;
  concave corner, being a region of or a point on the contour having positive peaks of curvature;
  convex corner, being a region of or a point on the contour having negative peaks of curvature;
  straight segment, being segments of the contour having zero curvature;

and/or
  circular segments, being segments of the contour having constant curvature.

According to the second aspect of the invention which relates to a method of recognition, the matching step may further comprise matching a recognition image with training images stored in a database, the method for matching may comprise the following steps:
  for each training image:
    determining the values of roll, tilt and pan of the transformations bringing the features of the recognition image to be identical with the features of the training image;
    identify clusters in the parameter space defined by the values of roll, tilt and pan determined by said transformations and
  identify clusters having predefined intensity as corresponding to an object type and localization.

The database may comprise for each image one or more records each representing a feature with its intrinsic properties and its extrinsic properties.

Furthermore the matching may comprise the steps of:
  resetting the roll, tilt and pan parameter space,
  for each feature in the recognition image, matching properties of the recognition image with the properties stored in the database,
    in case of match: determining roll, tilt, and pan based on the extrinsic properties from the database and from the recognition image,
    updating the parameter space, and
    test for clustering and store coordinates of clusters with sufficiently high density/population with an index of the training image,
  repeating the steps until all features in the recognition image have been matched.

The determination of the roll, tilt and pan are preferably only done for features having similar or identical intrinsic properties compared to the intrinsic properties in the database. In this way a lot of computing time may be saved.

Moreover the matching may comprise comparing the intrinsic descriptors of the recognition image with the intrinsic descriptors stored in the database thereby selecting matching features.

The generation of database mentioned in the third aspect may furthermore be generated according to the steps and features described below.

Preferably the extrinsic properties comprises a reference point and a reference direction. Whereas the intrinsic properties preferably comprises numerical quantities of features.

The object may be imaged by a method using at least two imaging devices thereby generating at least two recognition images of the object and wherein the method for matching may be applied to each recognition image and wherein the match found for each recognition image are compared.

Furthermore the method using two imaging devices may comprise the steps of:
  for each imaging device, providing an estimate for the three dimensional reference point of the object,
  for each imaging device, calculating a line from the imaging device pinhole to the estimated reference point, and when at least two or more lines have been provided,
  discarding the estimates in the case that the said two or more lines do not essentially intersect in three dimensions, and when the said two or more lines essentially intersect,
estimating a global position of the reference point based on the pseudo intersection between the lines obtained from each imaging device.

In the following, the invention and in particular preferred embodiments thereof, will be presented in greater details in connection with the accompanying drawings.

BRIEF DESCRIPTION OF FIGURES

FIG. 15, illustrates the greytone landscape derived from an image.

FIG. 17, illustrates the structure of the database of descriptors derived from training images.

FIG. 18, illustrates the structure of descriptors derived from recognition image.

DETAILED DESCRIPTION OF PREFERRED EMBODIMENTS OF THE INVENTION

The invention described here is aimed at all the situations described in the section Background of the invention. Focus is put on the following properties:

Simple generation of training information
Reasonably low volume of training information.
Exact treatment of the perspective effects
Generality concerning the shape and the visual appearance of the objects, e.g. sharp 3D edges and landmarks are not necessary
High speed recognition without extensive 2D matching between images or 3D reconstruction.

Functionality

The computer vision system is used for classifying and/or locating bounded 3D objects belonging to distinct classes. The system consists of one or more cameras whose images are interpreted in terms of 1) class of 3D objects and 2) their spatial position and orientation (pose). Its function is to some extent independent of possible partial occlusion by other objects and of poor image segmentation. The objects need not have characteristic decorations or sharp edges. The function is independent of camera position and object size relative to the object-camera distance. The image interpretation is speed optimized which implies the use of digital camera, swift electronic transmission of image data, and optimized code. Furthermore the camera used in the system does not necessarily have to be an optical camera, the camera can be of other kinds such as a thermal camera.

Definitions

Figure 14:
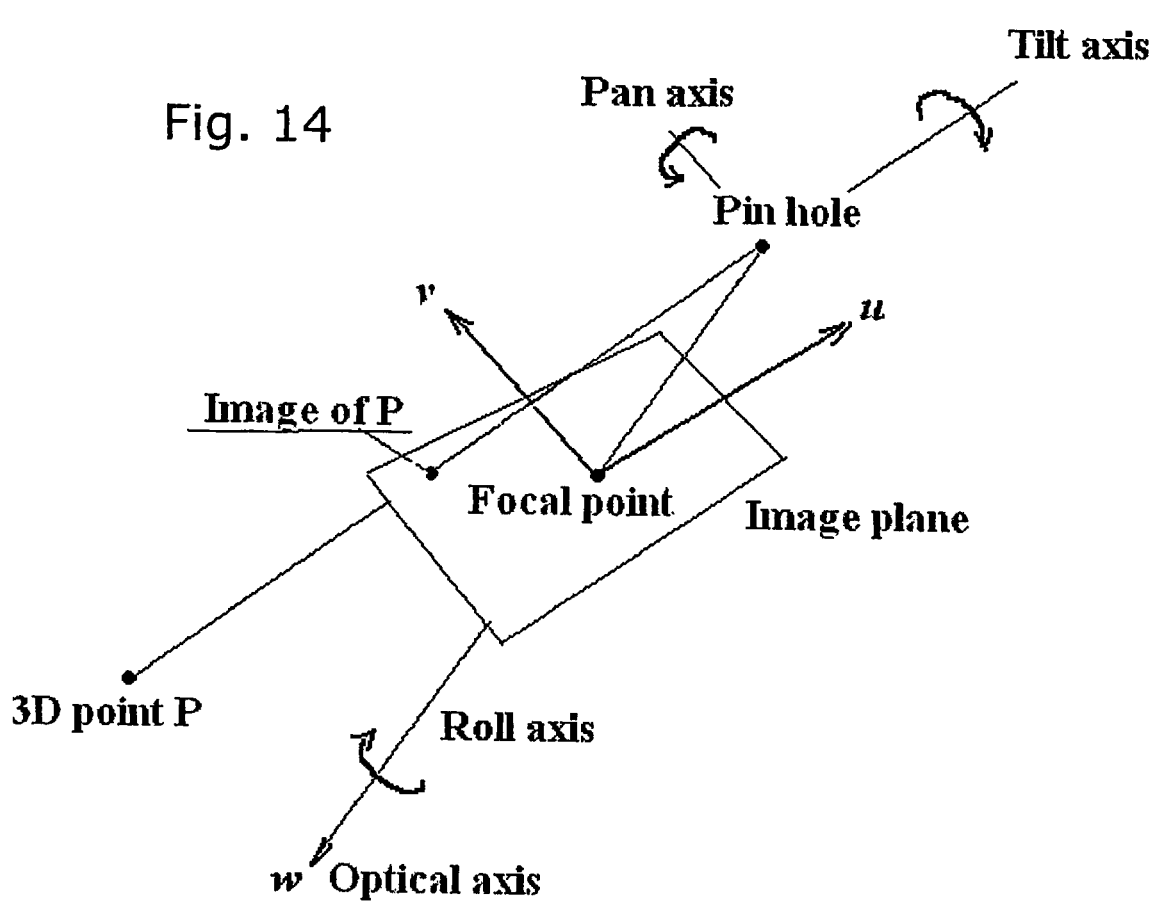
FIG. 14, illustrates a pinhole model of a camera.

Pinhole model of a camera, illustrated In FIG. 14: The frame (coordinate system) of the camera is defined by the axes u,v,w. The focal point has the coordinates (u,v,w)=(0,0, f), where f is the focal length of the camera. Preferably units of u,v and f are pixel units. Physical cameras have negative values of f. The relevant homographical transformation can be described by two successive rotations about the tilt-axis (parallel to the u-axis), and the pan axis (parallel to the v-axis).

A camera is an imaging device with a pinhole, i.e. center of a perspective 3D-2D transformation, and an image plane. The optical axis is a line through the pinhole, essentially perpendicular to the image plane. The image of the optical axis of the camera is called the focal point, illustrated in FIG. 14. The image has two axes, a vertical (v) axis and a horizontal (u) axis.

Preferably the following 2D properties of the visual appearance of objects are considered:

1) the outer contour (always existing),
2) contours appearing inside the outer contour,
3) images of sharp 3D edges of the object appearing inside the contour, and
4) 2D edges in decorations.

All these properties may appear as (one-dimensional) lines or curves in the image. In the following these features are called characteristic curves. Specific features of characteristic curves are called primitives. Primitives can be point-like (inflection points, points of maximum curvature etc.) or one-dimensional (straight sections, sections with constant curvature etc). Specific pairs, triplets, or higher sets of primitives are called features. The most useful types of features are pairs of primitives. A few of these are illustrated in FIG. 2a and 2b.

An image of a single, specific object and with a known object-camera pose taken by a specific camera is called a training view. An image of a scene to be interpreted by the system is called a recognition view.

Numerical descriptors describes the intrinsic properties and extrinsic properties of a feature. Intrinsic properties are described by the rotation invariant descriptors of features, whereas the extrinsic properties are described by the location and rotation of a feature in an image.

A feature preferably has three extrinsic descriptors: The two coordinates of the reference point of the feature, and the reference direction after homographic transformation.

Level contours: A level contour is preferably an ordered list of image coordinates corresponding to a constant greytone value g. The coordinates are obtained by linear interpolation between two pixels, one with greytone above g, the other with greytone below g.

Edge contours: An edge contour is preferably an ordered list of points representing positions in the digital image and belonging to a contour. A point is preferably obtained from a previous point by calculating the gradient perpendicular to the present motion direction and moving in the direction of the maximum gradient. Subpixel coordinates of contour points are obtained by calculating the average greytone over (integer) pixel positions some distance behind and ahead of each contour point. This average greytone is used as a basis for an interpolation leading to a shifted position of the considered point.

Views/images or sections of views/images can be subject to 2D transformations. The transformations considered here are characterized by virtual rotations of the camera about its pin-hole. These transformations are denoted as homographic transformations. Homographical transformations can be specified by successive camera rotations about specific axes. In a common notation tilt is a rotation about the axis parallel to the horizontal image axis, pan is a rotation about the axis parallel to the vertical image axis, and roll is a rotation about the optical axis. These rotations are illustrated in FIG. 14. Let $\Omega$ be an image or an image section. The transformed image or image section has the symbol $\Omega'=H(\Omega)$, where H is the homographic transformation. Any given point Q in the image defines a class of homographic transformations with the property that the point Q is transformed into the focal point. The image or image section after such a transformation has the symbol $H_Q(\Omega)$. One member of this class of transformations $H_Q$ is characterized by a tilt followed by a pan, and no roll. This transformation will be called the tilt pan transformation $H_{Q,tp}$. There exist many other members of this class. It is preferred that they have well defined algorithms.

Figure 1:
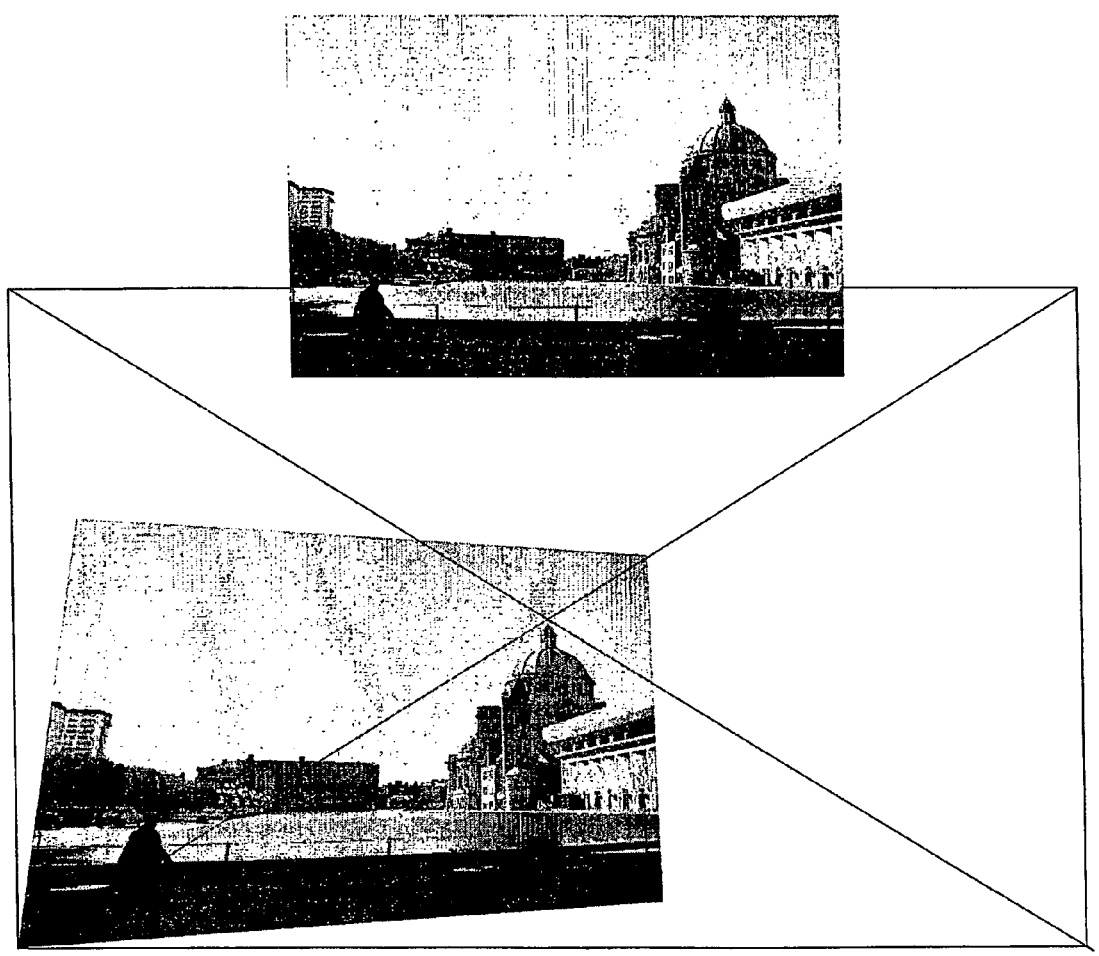
FIG. 1, illustrates a tilt-pan homographic transformation.

In FIG. 1, a tilt-pan homographic transformation is illustrated. The original image before the transformation is the upper image. Below is the image after the tilt-pan homographic transformation, wherein the tip of the dome is moved to the focal point.

Preferably the objects of the same class are uniform with respect to geometric form and to some extent also decoration and the non-occluded part of objects has sufficient characteristic curves. In order to achieve the best detection of characteristic curves, the illumination of the scene is preferably reasonably constant.

Overall Description of the Method

The recognition is based on the analysis of a large number of training views. These training views are recorded by a camera viewing a real object or constructed using the CAD representation of the object. Characteristic curves are derived from the training views, and primitives of the curves are detected. Intrinsic and extrinsic descriptors of features are stored in a database together with data about the object class and pose of the view. The above activities related to training are performed off-line.

A similar image analysis is performed during recognition. The remaining part of the recognition takes place in two stages: First the intrinsic descriptors of the recognition view are compared with those of the database. Second, among the best matching features it is explored which features agree mutually in the sense that they suggest the same object class at the same pose.

Methods for Reduction of Number of Training Views

As a rigid body has 6 degrees of freedom, the diversity of views is very large. Two methods for reduction of the training volume are employed. First, the extrinsic descriptors are derived from tilt-pan homographically transformed images. The transformation used for a given feature is $H_{Q,tp}$, where Q is a reference point of the actual feature. Second, the intrinsic descriptors used in the match search are invariant to image rotations, equivalent to rolling the camera. The above two strategies imply that the volume of training views can be limited to three degrees of freedom in spite of the fact that a rigid object has six degrees of freedom. For each feature the training database preferably contains:

a) Descriptors invariant to tilt-pan homographic transformation and to a roll operation, b) A rotation-describing descriptor for the angular 2D orientation relative to an image axis, c) The tilt and pan angle involved in the tilt-pan homographic transformation.

Point a) requires that a reference point can be assigned to the feature.

Point b) requires that a reference direction can be assigned to the feature.

In the training session the reference direction and reference point may be assigned manually by a user.

Figure 16:
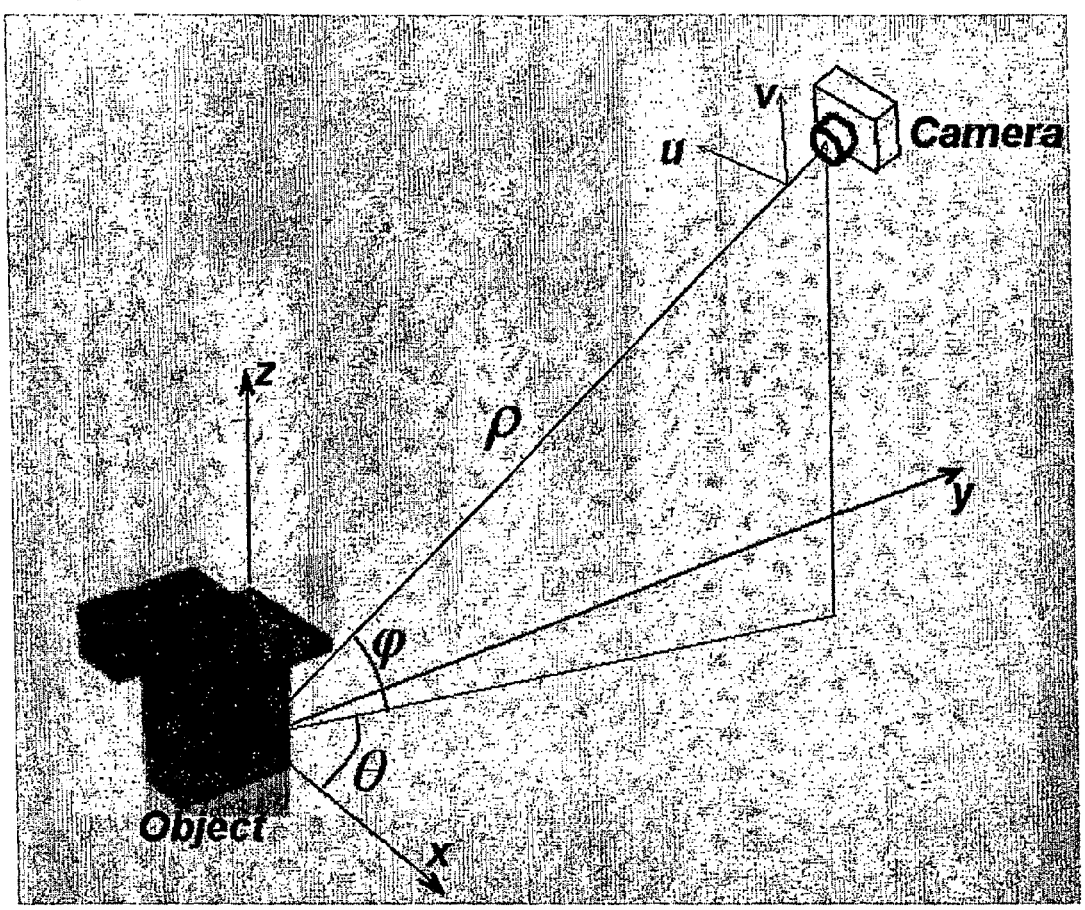
FIG. 16, illustrates the training geometry.

The three degrees of freedom involved in the training can be chosen to be the spherical pinhole coordinates ($\rho$, $\phi$, $\theta$) in the object frame, see FIG. 16. During training the optical axis is going through the origin of the object frame, and the roll angle of the camera is zero. Thus, $\rho$, $\phi$, $\theta$ are length, azimutal angle and horizontal angle, respectively, of the vector from the origin of the object frame and the pinhole. A user assigns the origin of the object frame in the training step. The intervals and step sizes of $\rho$, $\phi$, and $\theta$, necessary to be trained depend on the application. In case of moderate or weak perspective only few values of $\rho$ needs to be trained as the linear dimensions of the features are approximately inversely proportional to $\rho$.

Recognition: Transformation, Match Search, Back transformation and Cluster Analysis.

In the first step of the recognition the recognition view is analyzed, the descriptors of transformed features are derived, and an appropriate number of the best matches between descriptors from the recognition view and those of the database (item a) in Section (Methods for reduction of number of training views) are found. In the second step one considers the items b) and c), Section (Methods for reduction of number of training views), belonging to the recognition view and the matching record of the database. These data are used in a suitable back transformation thereby calculating the full 3D pose suggested by the actual features. Clusters of suggestions (votes) in the 6-dimensional configuration space (one space for each object class) are interpreted as real objects. This cluster analysis is essential for eliminating false features, i.e. detected combination of primitives belonging to different objects.

Primitives of Characteristic Curves and Features

Examples of preferred primitives for recognition:

1) Segments of straight lines
2) Segments of relatively large radius circles
3) Inflection points
4) Points of maximum curvature
5) Points separating portions of very low curvature and very high curvature.
6) In case of curves enclosing small areas: The 2D center-of-mass of this area.

Figure 2:
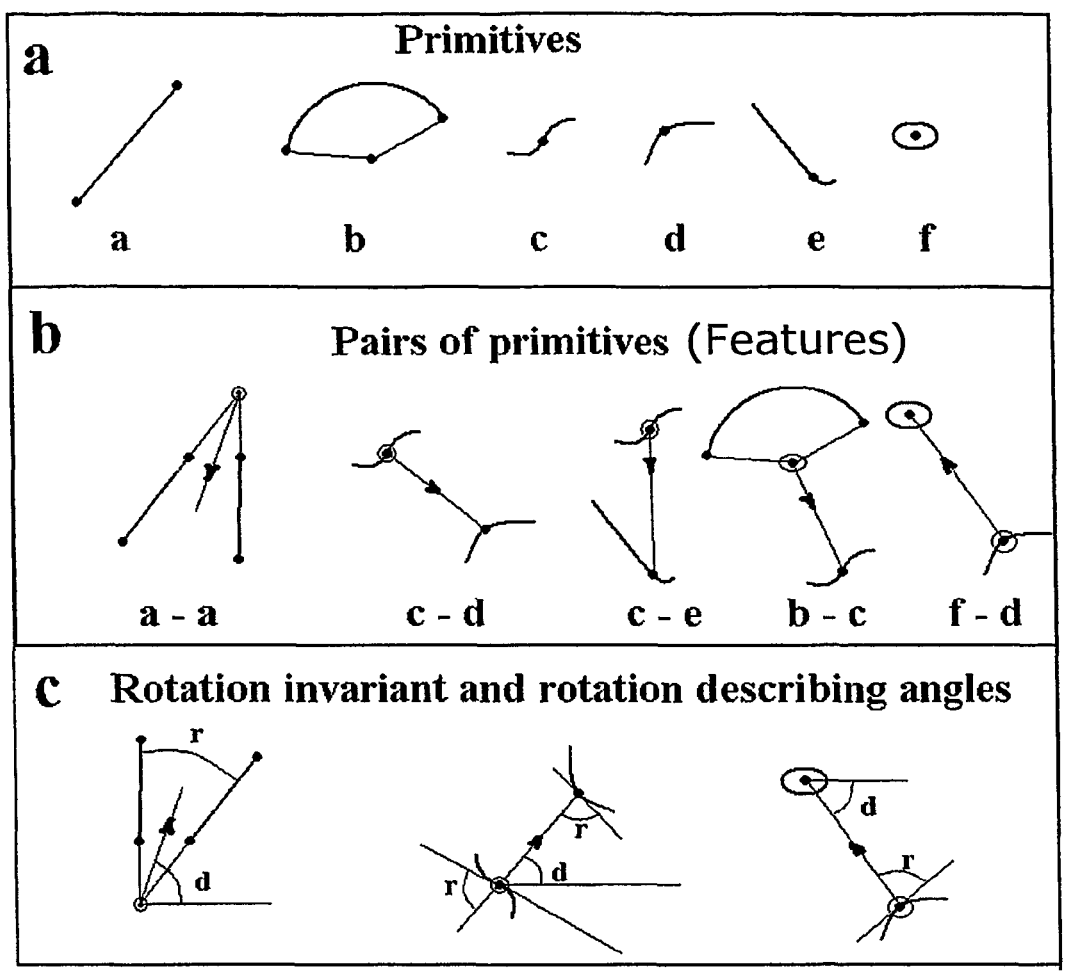
FIG. 2a-2c, shows primitives, pairs of primitives and angles.

FIG. 2-2*a* shows primitives mentioned in Section (Primitives of characteristic curves and features) above. FIG. 2*a* shows examples of primitives, FIG. 2*b* shows pairs of primitives, their reference points (thin circles) and their reference directions (arrows). FIG. 2*c* illustrates angles wherein, the angles r are rotation invariant, and the angles d are rotation-describing descriptors.

The sets of primitives used in the system should preferably have the following properties:
- a reference point
- a reference direction (without 180 degree ambiguity)
- one or more rotation invariant descriptors suitable for a match search.

Any combination of two or more primitives fulfilling these conditions can be employed. FIG. 2b shows example of suitable pairs of primitives including reference points and reference directions. In the case that segments of straight lines or circles are involved in a feature, then the recognition allowing partial occlusion of the features should preferably involve appropriate inequalities.

Rotation invariant descriptors of the pairs of primitives are for example distances between point like primitives, angles between portions of straight lines, angles between tangents and lines connecting point-like primitives, etc. FIG. 2c shows examples of rotation invariant angles, and the rotation describing angle (item b) in section (Methods for reduction of number of training views).

Advantages Using Two or More Cameras

Figure 13:
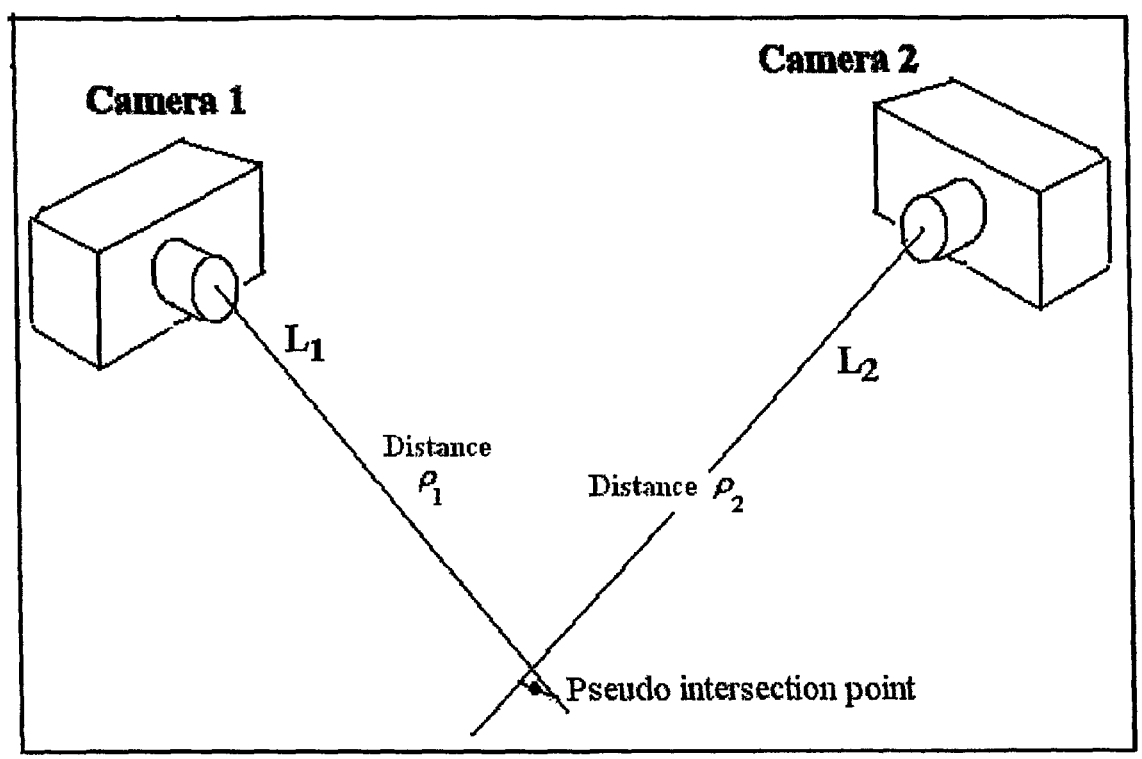
FIG. 13, illustrates two-camera operation.

An uncertain component of the pose in single camera applications is $\rho$, i. e. the distance between the pinhole and the reference point of the object. Errors come from pixel discretization, camera noise and fluctuating object dimensions. The uncertainty can be reduced significantly by correlating findings from two or more cameras as follows. Each camera gives an estimate for the 3D reference point of the object. With uncertain $\rho$ each camera defines a 3D line of high probability for the reference point position. The pseudo intersection between such lines is the most probable position of the reference point of the object. This is illustrated in FIG. 13.

This method is related to stereovision. Conventional stereovision has a fundamental limitation since a too short base line (distance between pinholes) gives an inaccurate depth determination, while a too large base line (and large angles between optical axes) makes the identification of corresponding points/features difficult. In the presently introduced method using features matching those of a multi view database, there is no need for finding corresponding points in the views. Therefore, the depth estimation achieved by a multi camera version of the present invention is more accurate than with ordinary stereovision.

Another advantage obtained by using more than one camera is the elimination of misclassifications and wrong pose estimations. This elimination is particularly important in case of objects with a symmetry plane viewed with weak perspective.

Estimate of Training Volume and Recognition Times

In a typical application, the step size in $\phi$-$\theta$ space is 4 degrees. This implies about 3000 views per value of $\rho$ for an unrestricted angular range. Most applications need only 3-4 different $\rho$-values, giving a total of about 10,000 images. A typical number of sets of primitives in each training view is 50, and the typical number of 4 byte floating-point entities in each database record is 8. Then the total volume of the database is of the order 16 MByte for one object class. A speed optimized match search in this database is expected to last less than one second per object class on a 1 GHz CPU. In applications where it is known a priori, that the object pose is confined to a smaller part of the ($\rho$,$\phi$,$\theta$)-space, the above numbers can be reduced correspondingly.

The embodiment described herein comprises the preferred steps used in the computer vision system. The system is able to classify and locate 3D objects lying at random in front of one or two computer-vision cameras. As outlined in the summary of invention of the system, the recognition is preferably based on:
- Determination of characteristic curves in the training and recognition images
- Derivation of feature descriptors (primitives and pairs of primitives),
- A recognition processes to be used in the 3D interpretation The characteristic curves used are edges in greytone images. In this description the 'edges' are defined as level contours (curves of constant greytone) or edge contours (curves of high gradient). The method for deriving level contours is described and exemplified in Sect. (Derivation of level contours from greytone images). By using subpixel-defined contours, it is possible to derive reliable characteristic contour primitives (straight segments, inflection points, corners, etc.) as outlined in Sect. (Derivation of primitives and features from contours). The 3D interpretation using primitives derived from training and recognition images is described and exemplified in Sect. (Steps in the 3D interpretation).

Derivation of Contours from Greytone Images

This section describes the Image analysis leading to level and edge contours. The definition of level contours: The greytone landscape of the frame in the upper right section of FIG. 15a is shown in FIG. 15b. A level contour is preferably an ordered list of image coordinates corresponding to a constant greytone value g. The coordinates are obtained by linear interpolation between two pixels, one with greytone above g, the other with greytone below g. Below follows explanations of a few definitions.

1. A greytone image consists of a 2D array G[x,y] of greytones. Each array member is a pixel.
2. Each pixel has integer coordinates in the image plane.
3. In analogy with a landscape the greytones are considered as heights in the greytone landscape, this is illustrated in FIG. 15a and 15b.
4. With suitable interpolation the greytone can be considered as a function of continuous pixel coordinates.
5. A curve in the image plane going through points with common greytone g is called a level contour. Note that level contours preferably do not cross each other.
6. The 'gradient' at a point (x,y) is defined as; max (|G[x,y−1]−G[x,y+1]|, |G[x−1,y]−G[x+1,y]|).
7. Pieces of level contours with high gradient are 'edge like'.

It is the aim of this section to describe an efficient way of deriving meaningful level contours. The result of the image analysis is a list of level contour segments, and each level contour segment is a list of pixel positions.

Deriving Seeds for Contours

Figure 3:
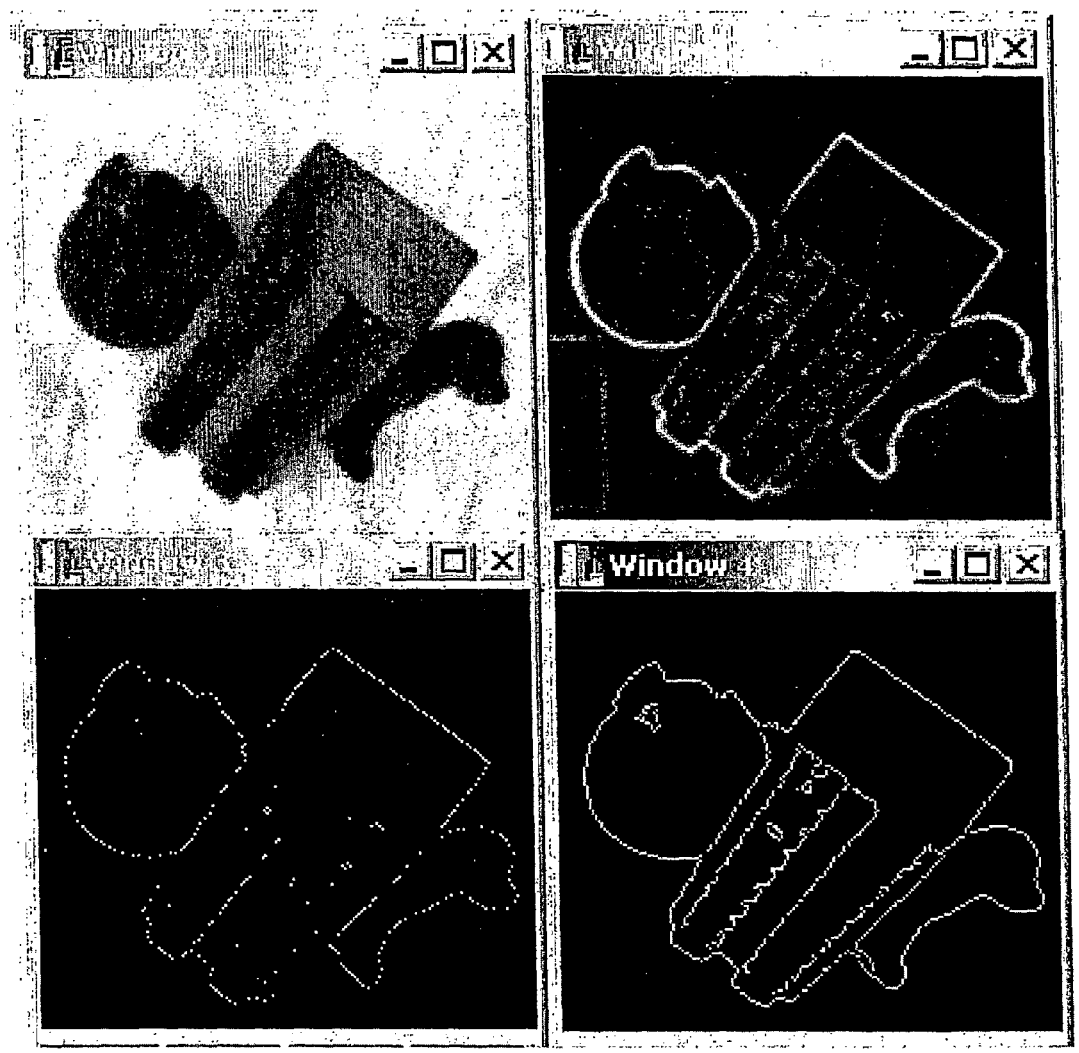
FIG. 3, shows an example of an image in four different windows.

In the first step a 'gradient image' is derived as an image in which the greytone is equal to the gradient of the original image. A potential seed is defined as local maximum in the gradient image. A list of potential seeds is formed. Maxima with gradients below a threshold are not used as seeds. The list of seeds contains the greytone, the gradient and the pixel coordinates. This list is sorted according to gradient magnitude. FIG. 3 shows an example of image analysis leading to seeds. Window 1 in FIG. 3 shows the original image, Window 2 in FIG. 3 shows the gradient image. Window 3 in FIG. 3 shows the potential seeds. Window 4 in FIG. 3 shows the contours derived.

Deriving the Contours

The first level contour to be generated uses the seed with highest gradient. A standard contour search is applied by using the greytone threshold equal to the greytone of the seed. The contour is followed until at least one of the following stop conditions is fulfilled:
1) the image border is reached,
2) the seed is reached again (closed contour) or
3) the absolute value of the gradient at the next contour point falls below a threshold.

The contour search is preferably bi-directional unless the contour is closed. Potential seeds closer than 1-2 pixels to the contour derived are disabled/eliminated.

The pixel positions in all contours may be shifted according to a linear interpolation using the greytone value characteristic for each contour. The result is shown in FIG. 4.

Figure 4:
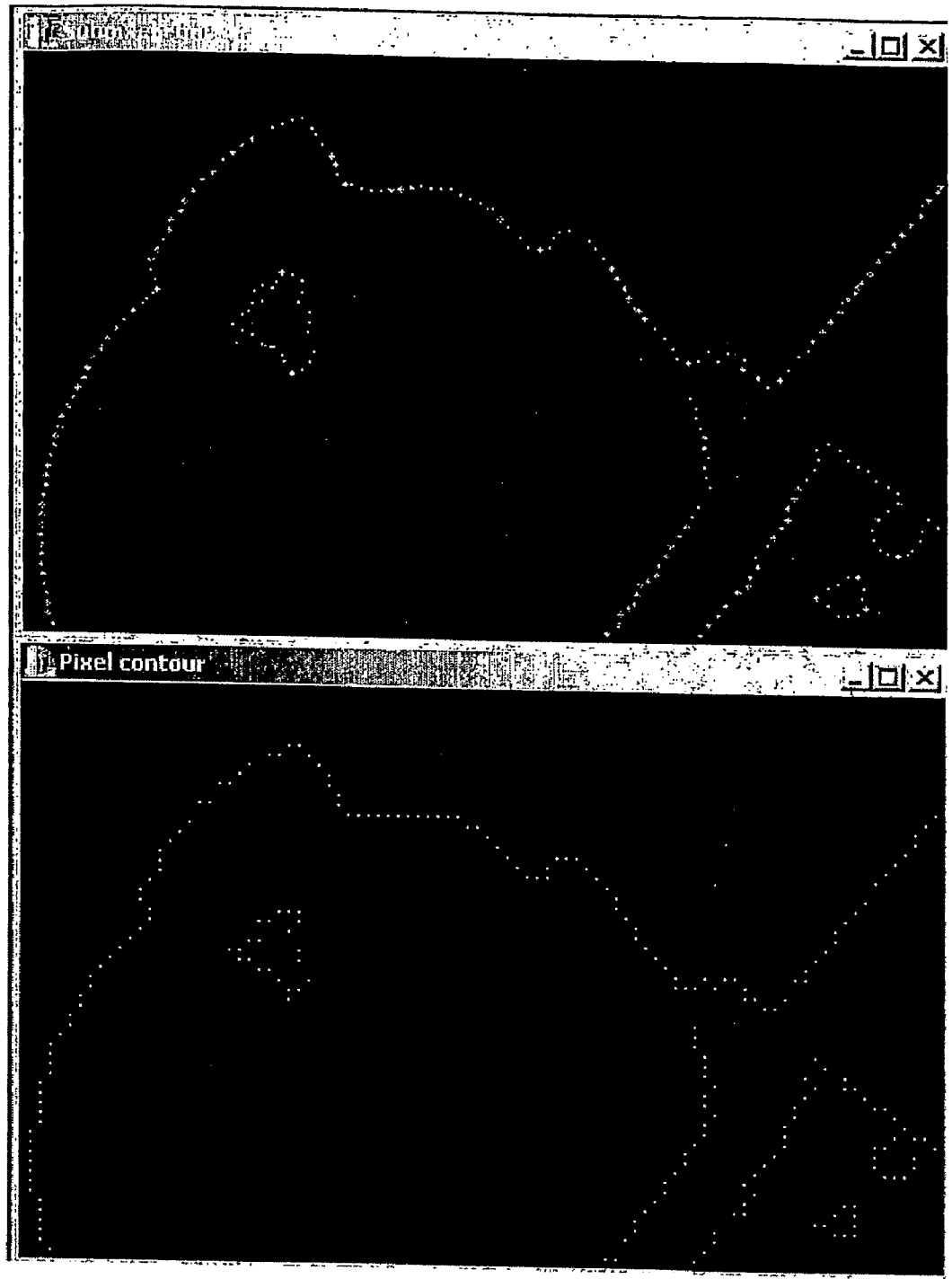
FIG. 4, shows the contours in the upper right corner of the image in FIG. 3. The window above in FIG. 4 shows the contour with subpixel accuracy while the window below in FIG. 4 shows the integer pixel positions of the contour.

The windows in FIG. 4 shows the contours in the upper right corner of the image of FIG. 3. The window above in FIG. 4 shows the contour with subpixel accuracy while the window below in FIG. 4 shows the integer pixel positions of the contour.

The next contour is generated using the non-disabled seed with highest gradient. New contours are then repeatedly generated until the list of seeds is exhausted. FIG. 3, Window 4, shows an example of contours derived. In this example, the number of contour sections is 9. Weaker contours than those shown, can be generated by choosing a smaller value for the minimum gradient of seeds.

Preferably the following procedure and constraints are applied:
a) The level contours are drawn starting from a seed point.
b) Potential seeds are pixels with local maximum of the gradient magnitude.
c) The level contours are derived in a succession of decreasing gradient magnitude of their seeds. Starting with the seed having the highest gradient magnitude.
d) Level contours positions are initially found as integer pixel positions with greytones above the value g and at least one neighbour pixel with greytone below the value g. Interpolated pixel positions are obtained by shifting each (integer) pixel position to new position derived by Interpolation. The position list in each level contour is ordered so that neighbour indices in the list correspond to neighbour positions in the image.
e) When moving along a direction with increasing position index, then regions with greytones higher than g are preferably at the right hand side.

In a second embodiment so-called edge contours are generated. In this case the above procedure and constraints may be applied with a change in step d, the new step d may be performed as described below:

Edge contours positions are found as pixel positions starting from a seed (first pixel) and moving towards the next pixel having the maximum gradient perpendicular to the present contour direction, and repeating these steps until one of the stop conditions is met. Sub pixel positions of edge contour points are preferably derived by calculating the average greytone over some pixels behind and ahead of each contour position. This average greytone may be used as a basis for interpolation.

Derivation of Primitives and Features from Contours

A primitive is a point on, or a segment of a contour with characteristic behaviour of the curvature, see FIG. 2a. The primitives listed in the summary of the invention are:
a) Segments of straight lines,
b) Segments of relatively large radius circles,
c) Inflection points,
d) Points of maximum numerical value of the curvature (corners),
e) Points separating portions of very low and very high numerical value of the curvature,
f) Small area entities enclosed by a contour.

A set of two or more primitives with specified characteristics is called a feature, illustrated in FIG. 2b.

As previously mentioned there are some requirements to useful features:
1) A feature should preferably have a reference point.
2) A feature should preferably have a unique direction in the image.
3) A feature should preferably have one or more rotation invariant descriptors. The properties described by such descriptors will be called intrinsic properties.

The requirement 3) is not strict. In the absence of intrinsic properties, the match search will be different. In this case the comparison between intrinsic features of training and recognition images is cancelled and the recognition is based solely on the cluster search.

If the image of an object contains only few features of one kind, additional feature types should be included in the analysis.

The aim of this section is to describe and exemplify how primitives and features are derived from the contours.

Curvature Versus Contour Length

A good tool for generating primitives is a function describing the curvature versus arc length along the contour. Let the tangent direction at a point on a contour be given by the angle $\theta$, and let s be the arc length along the contour measured from an arbitrary reference point. Then the curvature is $d\theta/ds$. The curvature function $\kappa(s)=d\theta/ds$ versus s is useful for defining primitives. Thus zeros in $\kappa(s)$ and reasonably high values of $|d\kappa/ds|$ are inflection points. Positive peaks of $\kappa(s)$ are concave corners, negative peaks of $\kappa(s)$ are convex corners (or opposite depending of the definition of background and foreground). Straight sections of the contour has $\kappa(s) \approx 0$ in a range of s. Circular sections with radius R has $\kappa(s)=+/-1/R$ in a range of s.

The due to the pixel discretization, the functions $\theta(s)$ and $\kappa(s)$ are derived by replacing differentials by differences. For this to be meaningful it is preferred to work with high accuracy and efficient noise reduction. Sub-pixel definition of contours is essential (see FIG. 4), and image blurring is often necessary in order to reduce the camera noise. It is also helpful to smooth the contour function $\kappa(s)$ before deriving the primitives.

Figure 5:
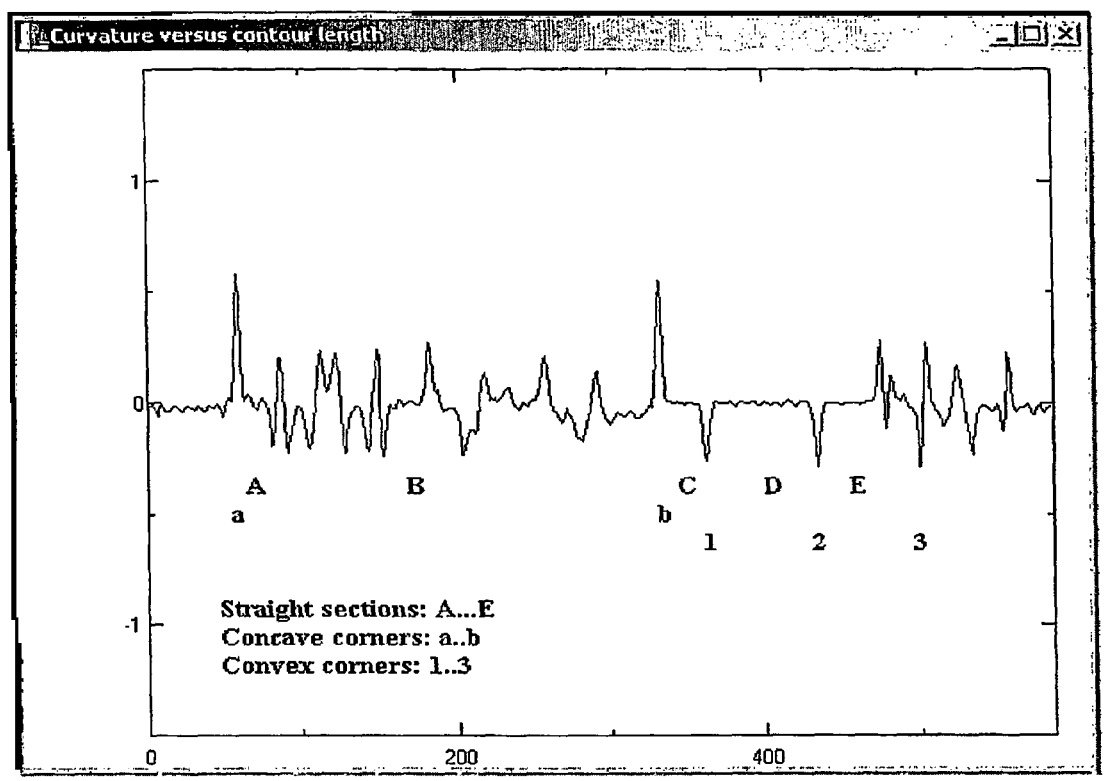
FIG. 5, illustrates Curvature κ(s) (in radians/pixel) as a function of arc length s (in pixels) along one of the contours of FIG. 3, Window 4. The symbols are used for showing the correspondence, see FIG. 6.
Figure 6:
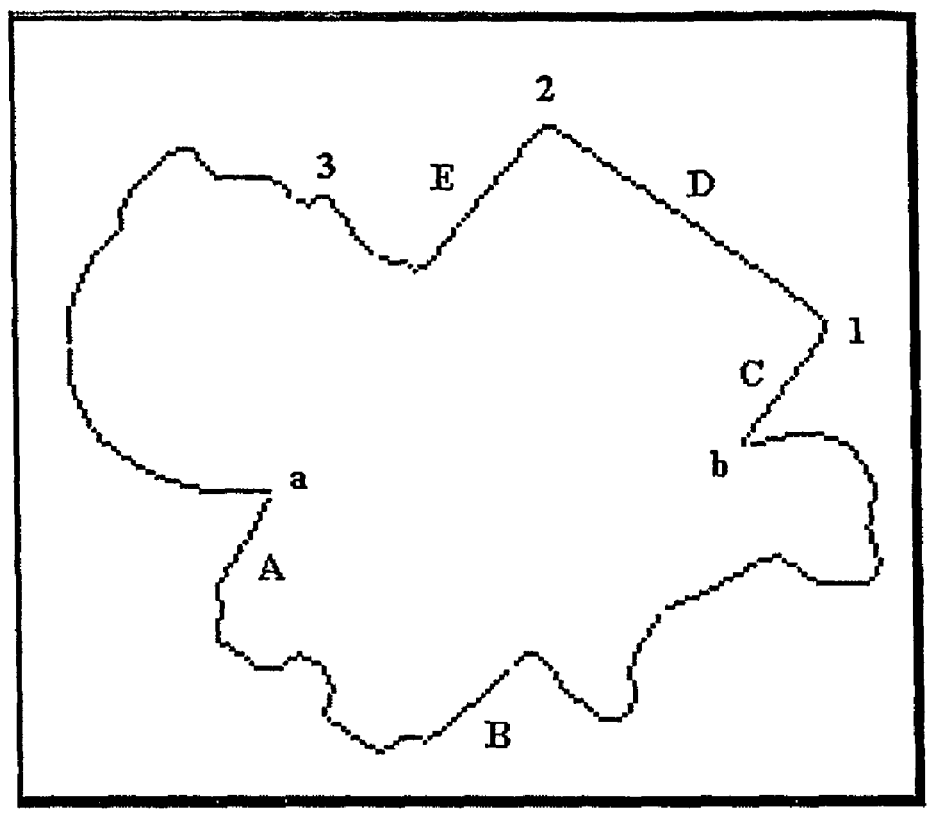
FIG. 6, illustrates the outer contour found for the image shown in FIG. 3. The symbols used for characteristic features correspond to those given in FIG. 5.

FIG. 5 shows the behaviour of the curvature function $\kappa(s)$ in case of the outer contour of the image in FIG. 3. In FIG. 6 are shown the symbols for straight sections and corners detectable using the curve in FIG. 5. There is a similar correspondence between zeros in $\kappa(s)$ and inflection points (not shown).

The algorithms for generating primitives need certain threshold values for the curvature. For example a straight line is characterized by $|\kappa(s)|<\kappa_a$ over a range of s, where $\kappa_a$ is the curvature threshold, and the integral $\int \kappa ds$ over the range should also be sufficiently small (below an angle threshold) since $\int \kappa ds$ represents the tangent angle variation. Another threshold $\kappa_b$ is relevant for deciding if a positive or negative peak is a corner or just noise. The corner criterion is then: $[\kappa(s)>\kappa_b$, and $\kappa(s)$ is the local maximum] or $[\kappa(s)<-\kappa_b$, and $\kappa(s)$ is the local minimum].

FIG. 5 illustrates Curvature $\kappa(s)$ (in radians/pixel) as a function of arc length s (in pixels) along one of the contours of FIG. 3, Window 4. The symbols are used for showing the correspondence, see FIG. 6. FIG. 6 illustrates the outer contour found for the image shown in FIG. 3. The symbols used for characteristic features correspond to those given in FIG. 5.

Steps in the 3D Interpretation

In subsection (The training process) below, the training process is described in which a large number of training images is created. In subsection (The recognition process) below the steps in the recognition process are outlined, i.e. how features derived in the training process are compared with those of a recognition object. In Section (The recognition process in case of pairs of line segments as features) the steps of the recognition process in special case of line pairs as features are described. The special status of the distance parameter ρ in the object-camera pose and the use of two or more cameras are discussed In Section (The special status of the parameter ρ, the use of two cameras).

The Training Process

In the training process a large number of images of the object with known object-camera poses are generated. This can be done by construction in a CAD system or using a camera.

The training geometry is illustrated in FIG. 16, wherein the frame of the object is given by the axes x,y,z. The optical axis of the camera is going trough the origin of the object frame. The horizontal u-axis of the camera is preferably parallel to the x-y-plane of the object frame, see FIG. 16. The training parameters are ρ,φ,θ.

It is necessary to produce many training images corresponding to different camera poses (positions and orientations) relative to the object. Because of the use of:
1) homographic transformations during recognition and
2) rotation invariant intrinsic descriptors, the training involves only 3 degrees of freedom. These degrees of freedom are chosen to be the spherical coordinates (ρ,φ,θ) of the camera pinhole in the frame of the object. The angular pose of the camera is characterized by an optical axis going through the origin of the object frame, and a horizontal image axis parallel to a specified plane in the object frame (see section, 'Recognition using tilt-pan homographic transformation'). The camera poses used in the training are suitably distributed in the ρ,φ,θ-space. Usually the chosen poses form a regular grid in this space. The discretization step of φ and θ is preferably of the order 2-5 degrees. The range of ρ and the number of different ρ-values depend on the situation. In this presentation we do not go in detail with the distribution in ρ,φ,θ-space of the training poses. A single index i is used for the training pose assuming a well-known relation between this index and the corresponding pose of the training camera relative to the object.

Figure 11:
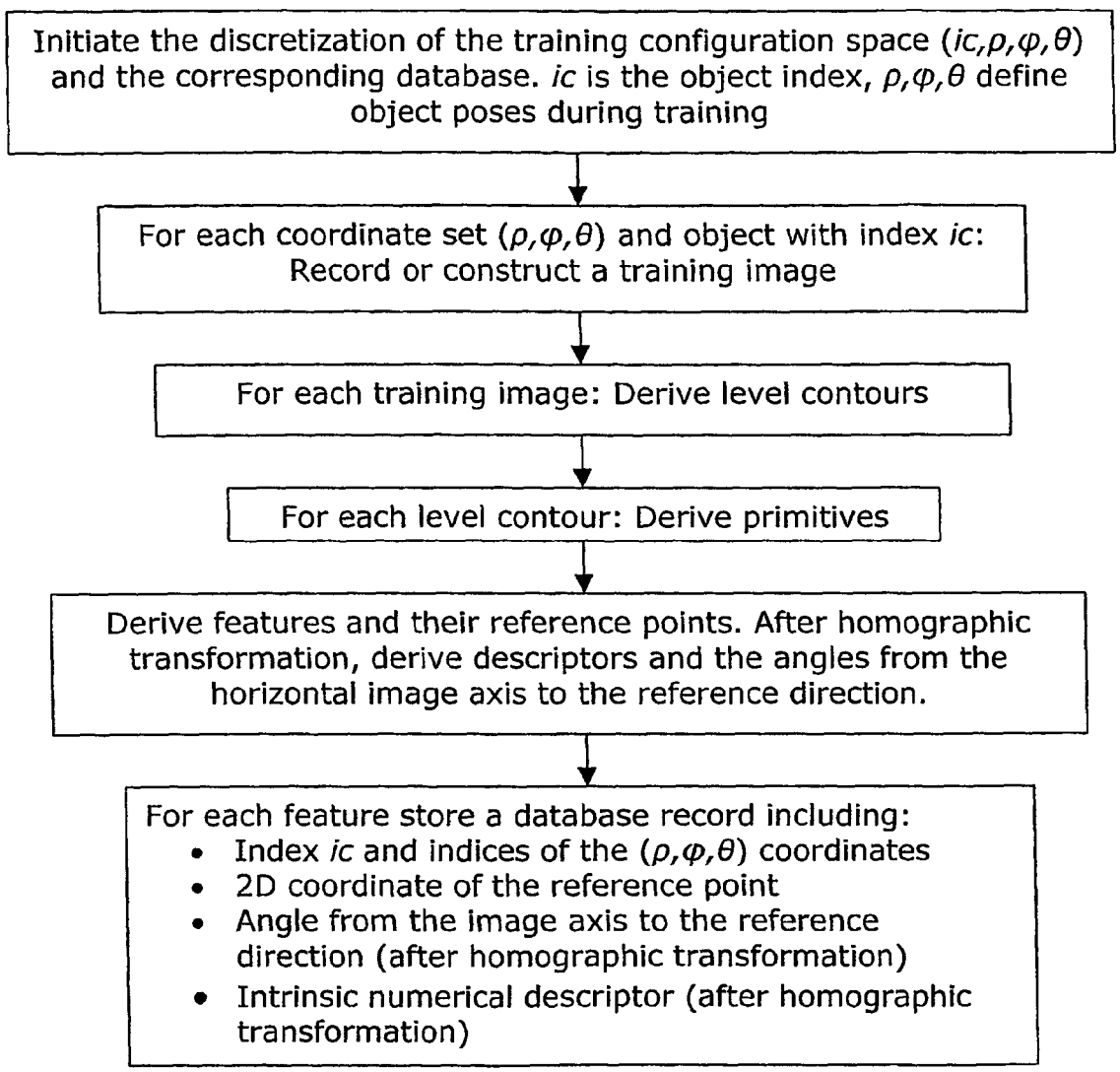
FIG. 11, shows a flow chart describing the processing for training.

The flow chart in FIG. 11, describes the processing for training.

The Recognition Process

Consider a certain feature type. Each training image contains a number of features. Let these features be $\Pi_{i,j}$ where i is the index of the training image and j is the index of the feature in the image. Let now $\pi_j$ be feature j in the recognition image. Each feature has the following properties: 1) the reference point Q, 2) the reference direction defined by the angle γ, and 3) intrinsic properties consisting of one or more numerical quantities. We denote the intrinsic properties by the vector Λ. Note that γ and the components of the vector Λ must be derived after a tilt-pan homographic transformation (see section, 'Recognition using tilt-pan homographic transformation') moving the point Q to the mid-image point.

The match search involves a 1) comparison of $\Lambda(\pi_j)$ with $\Lambda(\Pi_{i,j})$ and 2) a cluster search in the parameter space describing the pose of the potential recognition objects. If $\Lambda(\pi_j)$ is sufficiently similar to $\Lambda(\Pi_{i,j})$ then there is match in relation to intrinsic parameters. For all intrinsic matches, the recognition pose derived from i, $Q(\Pi_{i,j})$, $\gamma(\Pi_{i,j})$, $Q(\pi_j)$, $\gamma(\pi_j)$ is calculated and used in the cluster search. Here, three degrees of freedom of recognition pose is given by the index i defining the training pose, while the other three degrees of freedom are tilt, pan, and roll in the relevant homographic transformation. The mathematical details of this step are given in Sect. (Recognition using tilt-pan homographic transformations).

Each accepted cluster could be considered to represent a physical object. However, additional checks for 3D overlap between the guessed poses should be performed after the cluster search. The (ρ,φ,θ) configuration space for training is necessarily discretized, and so a simple recognition procedure gives an error of the order one half discretization step. This error may be reduced by interpolation between results from neighbour training images.

FIG. 17 and 18 illustrates the structure of the database of descriptors derived from training images and the structure of descriptors derived from recognition image. $\rho_i,\phi_j,\theta_k$ are descretized values of training parameters. Each record (line) in the tables is derived from a feature. In the present example each feature has three intrinsic descriptors. The number of extrinsic descriptors is preferably 3: The two coordinates of the reference point of the feature and the reference direction after homographic transformation. Any extrinsic descriptor of a record of the database and any extrinsic descriptor of a recognition record define together a tilt-pan-roll transformation of brining the recognition feature to coincide with the training feature. An increment at the corresponding point in tilt-pan-roll parameter space can then be performed. In case that the intrinsic recognition descriptors are sufficiently different from the intrinsic descriptors of the database the corresponding pair of features are not considered. This omission reduces the noise from false correspondences.

Many important details in this recognition process are presented in the example given in the next section.

Figure 12:
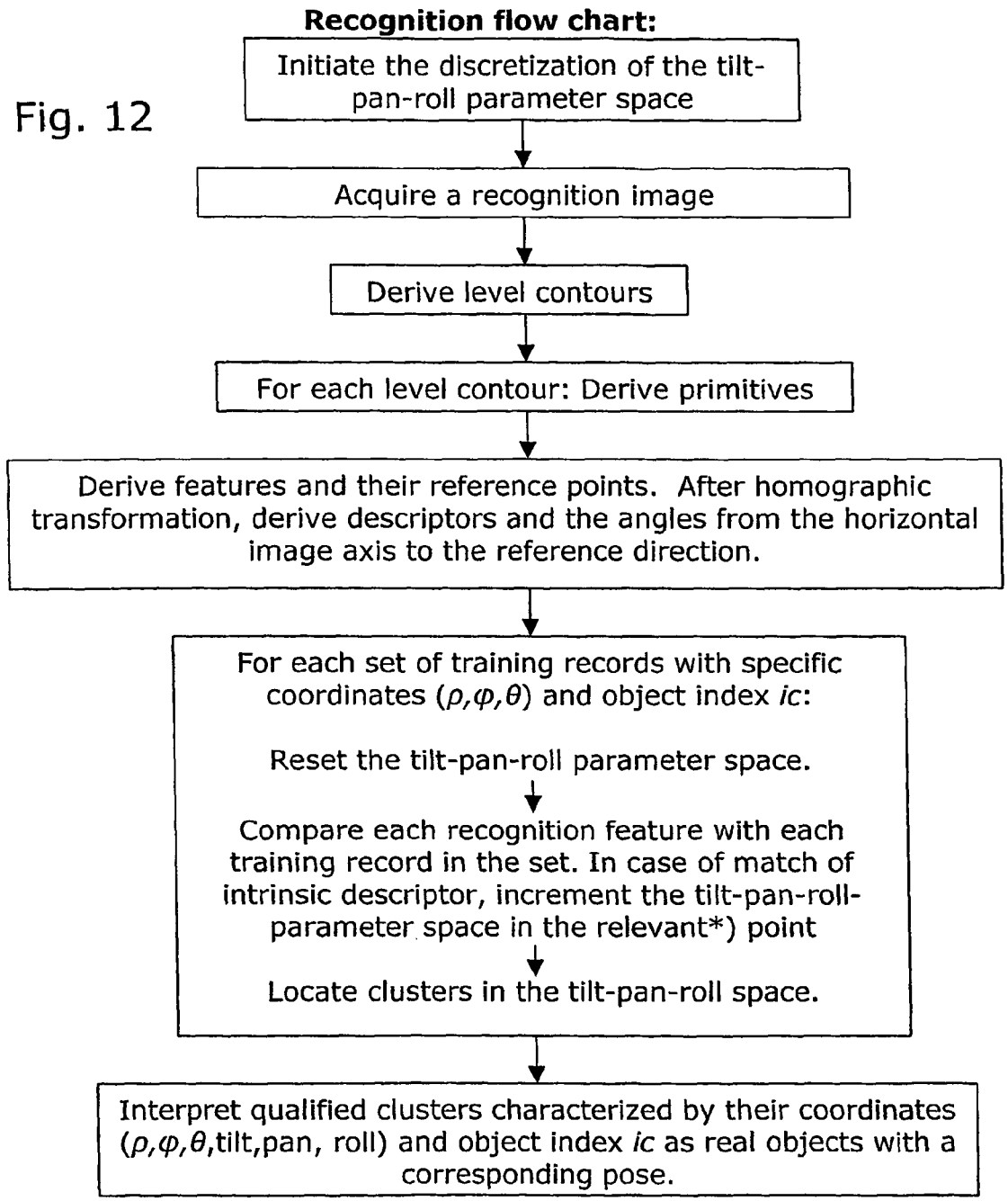
FIG. 12, show a flow chart describing the processing for recognition.

The recognition flow chart is shown in FIG. 12.

The Recognition Process in Case of Pairs of Line Segments as Features

Figure 7:
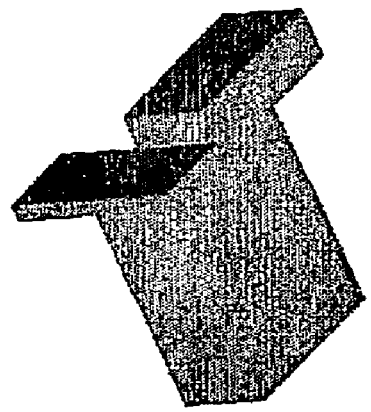
FIG. 7, illustrates a 3D triple brick object treated in the example for the pose determination.

In the following example the features used in the recognition are pairs of line sections, and the object is a 'triple brick' consisting of 3 box formed elements, see FIG. 7. FIG. 7 illustrates the 3D object treated in the example of the pose determination.

Straight sections are preferably derived from the contours of the training photos. All pairs of line sections in each training image are then considered as a feature. The intersection point of the line pair is the point Q, the angle γ is the angle between the horizontal image axis and the direction of the bisectrix of the line pair. Intrinsic descriptor are: 1) the angle V between the lines, and 2) the distances between intersection and the end points of the line section. Both types of intrinsic features are derived after the homographic transformation.

The distances between the intersection and end points should not be used directly in the match search, since partial occlusion of a line segment produce wrong distances.

The following discussion is focusing on searches based on the angular descriptor only.

Figure 8:
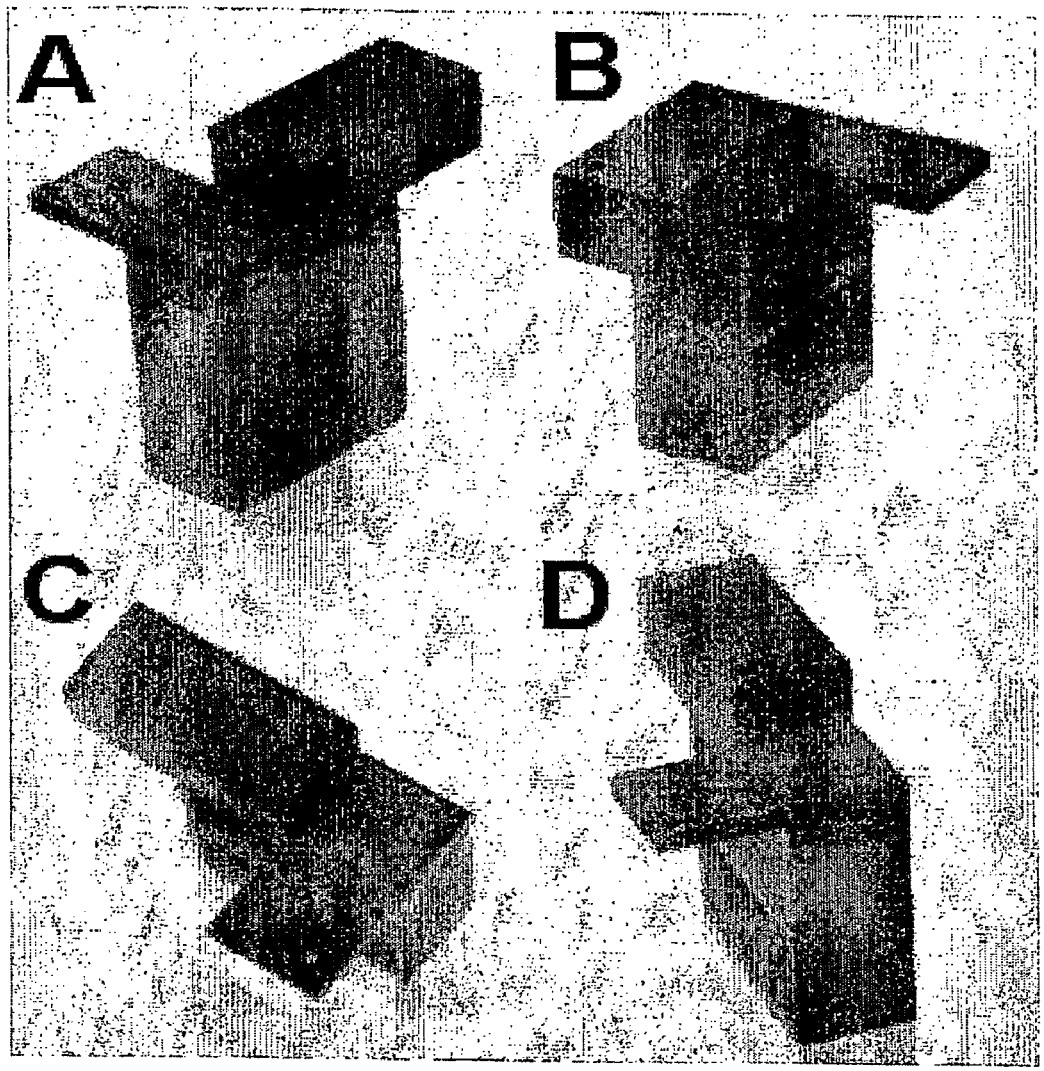
FIG. 8, illustrates training photos of a Lego model of the triple brick structure.

FIG. 8 illustrates training photos of Lego model of the triple brick structure.

Figure 9:
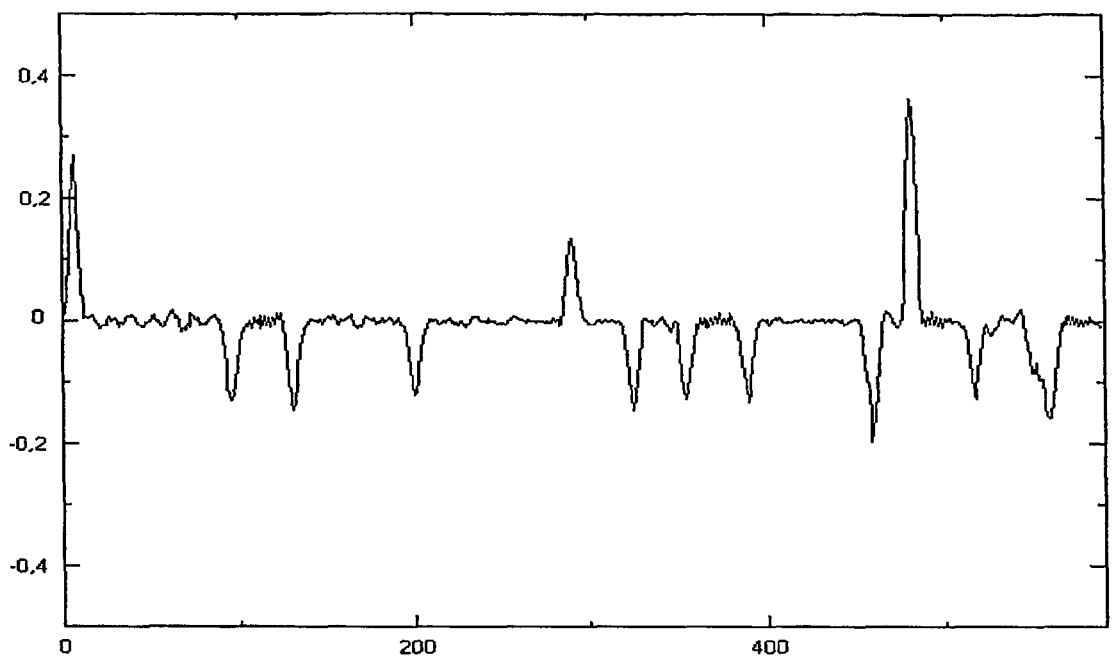
FIG. 9, illustrates the curvature in units of radians/pixel as a function of the arc length (in pixels) along the contour in FIG. 8A.

FIG. 9 illustrates the curvature in units of radians/pixel as a function of the arc length (in pixels) along the contour in FIG. 8A.

As seen in FIG. 9 it is easy to localize straight sections. There are 12 straight sections in this example. When deriving relevant pairs of lines some pairs are omitted, namely those with angles near 0 or 180 degrees between the lines. In this way a total of about 90 pairs in FIG. 8A can be considered.

Figure 10:
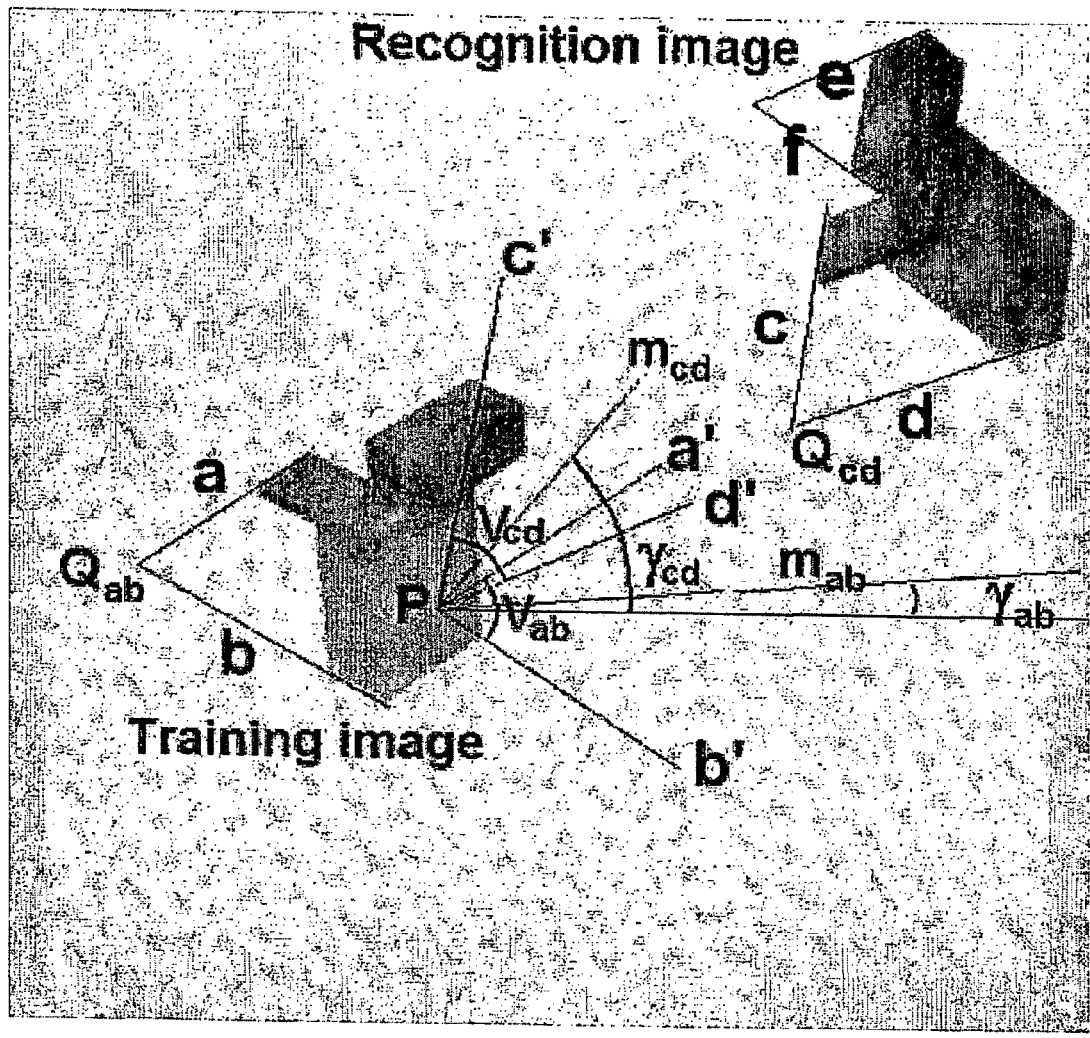
FIG. 10, shows a combined view of a training image and a recognition image.

FIG. 10 shows a combined view of training and recognition image. P is the focal center. The training line pair ab is homographically transformed so that $Q_{ab}$ moves to P. This gives rise to the line pair a'b'. The quantity $\gamma_{ab}$ is the angle between the horizontal direction and the bisectrix $m_{ab}$. The intrinsic descriptor of the ab line pair is the angle $V_{ab}$ between a' and b'. Similar definitions hold for the quantities derived from the line pair cd of the recognition image. Intrinsic descriptors other than the angle V are not shown.

FIG. 10, shows a combined view of a training image and a recognition image. In the example the positions $Q_{ab}$ and $Q_{cd}$, and the angles $\gamma_{cd}$ and $\gamma_{ab}$ between the bisectrices $m_{cd}$ and $m_{ab}$ define a tilt-pan-roll transformation between the training pose and the recognition pose. Thus a line pair of the recognition image related to a line pair of a particular training image defines a point in tilt-pan-roll parameter space. The line pair ef shown at the top right part of FIG. 10 has nearly the same angular descriptor as the ab line pair. And so, in the algorithm this line pair comparison produces a 'false' point in parameter space. However, it is characteristic for non-corresponding primitives that they produce very scattered points in parameter space, while corresponding line pairs gives a cluster in parameter space. If another training image is attempted to match with the recognition image in FIG. 10, one does not get any clustering of matching line pairs.

It is clearly seen that object occlusion and insufficient image segmentation does not harm the recognition process unless the background of false points in the parameter space becomes comparable to the signal formed by clusters of true matches.

If the number of false matches disturb the cluster search, it is possible to setup inequalities involving the above-mentioned additional intrinsic descriptors (distances between end points of line sections and the intersection point). Such inequalities allows the recognition lines to be only partially visible, but forbid the recognition lines to have any section present outside the range of the training lines.

Given a recognition images with features $\pi_j$ the algorithm runs as follows:

For each training image index i do

```
{
    Reset roll, tilt, pan parameter space;
    For all valid indices j and j' compare Λ(π_{i,j}) and Λ(π_{j'}) do
    {
        In case of intrinsic match
        {
            Derive roll r, tilt t, pan p, from Q(π_{i,j}), γ(π_{i,j}), Q(π_{j'}), γ(π_{j'});
            Update parameter space accordingly;
        }
    }
    Test for clustering and store coordinates of clusters with
    sufficiently high
    density/population along with the index i of the training image.
}
```

Above the 'intrinsic match' is based on similarity of the angles V and fulfillment of inequalities concerning the distances. The term 'update parameter space' means to increment the vote at the relevant point in parameter space.

In case of weak perspective, a single object may produce clusters with several training images, namely those having equal $\phi$- and $\theta$-values, but different $\rho$-values. Only one of these $\rho$-values corresponds to a real object, and so a special algorithm using the linear intrinsic descriptors should be used.

The back-transformation using the guessed training index i, and the cluster point in the tilt-pan-roll space is described in Sect. (Recognition using tilt-pan homographic transformations). The recognition process is now completed, since this back-transformation defines a pose of the recognition object relative to the camera (or visa versa).

The Special Status of the Parameter $\rho$, the Use of Two Cameras

The object-camera pose is described by 6 parameters, namely a) $\rho,\phi,\theta$ of the corresponding training image and b) (roll,tilt,pan) of the transformation between recognition pose and training pose. In case of weak perspective, the dimensionless descriptors of the primitives (such as angles) are almost independent of $\rho$, and the linear descriptors are approximately proportional to $1/\rho$. Therefore, with weak and moderate perspective it is possible to limit the training to rather few different $\rho$-values, and use a suitable interpolation. Preferably the recognition can be split into two parts. The first part concentrates on finding the 5 angular parameters, the second part derives the $\rho$-value using interpolation.

The accuracy of the final value of $\rho$ depends on the quality of the linear descriptors of the features and the number of different $\rho$-values involved in the training. Even using interpolation, the relative uncertainty of $\rho$ is preferably not smaller than the relative uncertainty of those intrinsic descriptors involving distances between image points. Increased accuracy can be obtained by using two (or more) cameras since 3D triangulation can be carried out as follows.

Consider two cameras Camera 1 and Camera 2 (FIG. 13). Let a classification and pose estimation result of Camera 1 be characterized by $(ic_1, \rho_1, \phi_1, \theta_1, t_1, p_1, r_1)$ where $ic_1$ is the object type index and the remaining parameters define the pose. If $\rho_1$ is completely uncertain, the remaining pose parameters define a line $L_1$ for the object reference point (see FIG. 13). Let in a similar way a guess $(ic_2, \rho_2, \phi_2, \theta_2, t_2, \rho_2, r_2)$ of Camera 2 define a line $L_2$. Since the global camera poses are known, the lines $L_1$ and $L_2$ can be represented in the global frame. In case that $ic_1$ and $ic_2$ are equal, and the $L_1$ and $L_2$ essentially cross each other, then the pair of guesses is assumed to represent a real object. Furthermore, the two—previously uncertain—parameters $\rho_1$ and $\rho_2$ can be determined by the pseudo intersection points (FIG. 13) with high accuracy. In this way one can not only enhance the accuracy of the pose estimation, but also avoid misinterpreting false single-camera results.

In the following recognition using tilt-pan homographic transformations will be described in greater details.

Recognition Using Tilt-pan Homographic Transformations

We shall use the following notation:

$$R_x(t) = \begin{Bmatrix} 1 & 0 & 0 \\ 0 & \cos t & \sin t \\ 0 & -\sin t & \cos t \end{Bmatrix}, \quad (1)$$

$$R_y(p) = \begin{Bmatrix} \cos p & 0 & -\sin p \\ 0 & 1 & 0 \\ \sin p & 0 & \cos p \end{Bmatrix},$$

-continued $$R_z(r) = \begin{pmatrix} \cos r & \sin r & 0 \\ -\sin r & \cos r & 0 \\ 0 & 0 & 1 \end{pmatrix},$$

$$K = \begin{pmatrix} f & 0 & 0 \\ 0 & f & 0 \\ 0 & 0 & 1 \end{pmatrix},$$

The R matrices describe rotations through the tilt angles t (tilt), p (pan) and r (roll). The matrix θ describes the perspective transformation with the focal length f. We shall use the composite rotation $\mathcal{R}(t,p,r)$ defined as $$\mathcal{R}(t,p,r) = R_z(r)R_y(p)R_x(t) \qquad (2)$$

where the succession of the matrix multiplications is running from right to left. $\mathcal{R}^{-1}(t,p,r) = R_x(-t)R_y(-p)R_z(-r)$ is the inverse transformation.

The elements of $\mathcal{R}(t,p,r)$ are $$\mathcal{R}(t,p,r) = \begin{pmatrix} \cos r \cos p & \sin t \sin p \cos r - \cos t \sin r & -\cos t \sin p \cos r + \sin t \sin r \\ -\sin r \cos p & -\sin t \sin p \sin r + \cos t \cos r & \cos t \sin p \sin r + \sin t \cos r \\ \sin p & -\cos p \sin t & \cos p \cos t \end{pmatrix}$$

We assume that a combined rotation-translation of a camera relative to an object frame is defined by $\mathcal{R}(t,p,r)|D$, where D is the translation vector expressed in the object frame. Then, if a point is represented by coordinates $(x_O y_O z_O)$ in the object frame and the same point is represented by the coordinates $(x_c y_c z_c)$ in the camera frame, one has $$\begin{pmatrix} x_C \\ y_C \\ z_C \end{pmatrix} = \mathcal{R}(t,p,r) \begin{pmatrix} x_O - D_x \\ y_O - D_y \\ z_O - D_z \end{pmatrix}$$

The coordinate axes of the camera frame expressed in the object frame are row vectors of $\mathcal{R}(t,p,r)$. Therefore the camera z axis has the global direction (sin p, −cos p sin t, cos p cos t).

We now define the training pose of the camera. We chose a pinhole position given by D=(−ρ sin φ, ρ cos φ sin θ, −ρ cos φ cos θ). We chose the angles (t, p, r) of the training camera to be equal to (θ,φ,π/2), This implies that the optical axis goes through the object origin. The choice r=π/2 implies that the $x_c$ axis of the camera is parallel to the yz-plane of the object frame.

Let the object-camera transformation be $T_{Object}^{Camera}$. This shall be split into two contributions:

$$T_{Object}^{Camera} = T_{TrainingCamera}^{Camera} T_{Object}^{TrainingCamera} \qquad (3)$$

$$T_{TrainingCamera}^{Camera} = \mathcal{R}(t,p,r)|O$$

$$T_{Object}^{TrainingCamera} = \mathcal{R}(\theta,\phi,-\pi/2)|D(\rho,\phi,\theta)$$

$$D(\rho,\phi,\theta) = (-\rho \sin \phi, \rho \cos \phi \sin \theta, -\rho \cos \phi \cos \theta) \qquad (4)$$

where O is the zero vector. The pose of the training camera is characterized by 1) an optical axis oriented towards the origin of the object frame, and 2) a camera $x_c$-axis parallel with the object yz plane. The angles r, t, p are roll, tilt, and pan angles characterizing the transformation $T_{TrainingCamera}^{Camera}$ from the training camera orientation to the recognition orientation. Note that the total transformation $T_{Object}^{Camera}$ can be derived from ρ and the five angles r, t, p, θ, and φ.

Let $\Omega(\rho,\phi,\theta,r,p,t)$ be an image recorded by a camera with the pose given by $(\rho,\phi,\theta,r,p,t)$. The relation between homographies with common pinhole position, i.e. between, say, $\Omega(\rho,\phi,\theta,r,p,t)$ and $\Omega(\rho,\phi,\theta,0,0,0)$ is a 2D transformation here expressed using homogenous coordinates $$\begin{Bmatrix} cu' \\ cv' \\ c \end{Bmatrix} = K \mathcal{R}(t,p,r) K^{-1} \begin{Bmatrix} u \\ v \\ 1 \end{Bmatrix} \qquad (5)$$

where (u, v) and (u', v') are image coordinates. The origin of the image coordinates is assumed to be at focal point.

We shall focus on the transformation $K\mathcal{R}(t,p,0)K^{-1}$ (zero roll angle). The reason is that K and R commute so the roll can be considered as an image rotation. The homographic (2D) operation H(t, p) defined by $H(t,p) \equiv K\mathcal{R}(t,p,0)K^{-1}$ can be written $$(u', v') = \frac{f(u\cos p + v\sin p \sin t - f\cos t \sin p), f(v\cos t + f\sin t)}{u\sin p - v\sin t\cos p + f\cos t\cos p} \qquad (6)$$

Note that the operator H(t, p) can operate on image points as well as on a full image. A transformation moving a specific point $Q=(u_Q, v_Q)$ to the origin (the focal point) is given by pan and tilt angles $$t_O(Q) = -\arctan \frac{v_Q}{f}, \qquad (7)$$

$$p_O(Q) = \arctan \frac{u_Q}{\sqrt{f^2 - v_Q^2}}$$

The inverse transformation is given by:

$$(u, v) = \frac{f(u'\cos p + f \sin p), f(u' \sin p \sin t - v' \cos t - f \sin t \cos p)}{-u' \sin p \cos t + v' \sin t + f \cos t \cos p} \qquad (8)$$

Let us consider a feature which in the relevant images has 1) a reference 2D-point Q and 2) a direction angle γ with the u-axis. This feature has the parameters $(Q_{tr}, \gamma_{tr})$ in the training image $Q_{tr}$ and $(Q_{rec}, \gamma_{rec})$ in the recognition image $Q_{rec}$. Thus $Q_{tr}$ and $Q_{rec}$ are corresponding points and the directions with angles $\gamma_{tr}$ and $\gamma_{rec}$ are also corresponding. It is interesting to compare the two images $$\Omega'_{tr} = H(t_0(Q_{tr}), p_0(Q_{tr}))\Omega_{tr}$$

$$\Omega'_{rec} = H(t_o(Q_{rec}), p_0(Q_{rec}))\Omega_{rec} \qquad (9)$$

These two images are rotated versions of each other, and the rotation angle of $\Omega'_{tr}$ relative to $\Omega'_{rec}$ is $\gamma_{rec} - \gamma_{tr}$. They both correspond to poses with the optical axis going through a 3D point Q which is imaged in $Q_{tr}$ and $Q_{rec}$. It can be proved that the tilt, pan, and roll angles, t, p, and r of the recognition pose relative to the training pose is given by:

$$\mathcal{R}(t,p,r) = \mathcal{R}^{-1}(t_0(Q_{rec}), p_0(Q_{rec}), \gamma_{rec}) \mathcal{R}(t_0(Q_{tr}), p_0(Q_{tr}), \gamma_{tr}) \qquad (10)$$

The treatment of the training images runs as follows: The images are analyzed in terms of features (single fixpoints, fixpoint groups, composite features). The values $Q_{rec}, \gamma_{rec}$ and various other intrinsic numerical descriptors of each feature are derived and stored in a database. For speed optimizing purpose, the elements of the matrix $\Re^{-1}(t_0(Q_{tr}), p_0(Q_{tr}), \gamma_{tr})$ is also calculated and stored.

During recognition, the intrinsic numerical descriptors of all features in the recognition image is compared with the descriptors of all similar features in the database. In case of sufficient match the parameters t, p, r of the rotation $T_{TrainingCamera}^{Camera}$ are derived from (9). The resulting values of t, p r and the parameters $\rho, \phi, \theta$ of the matching training image form together a guess of a 6-parameter pose of a 3D object, since they define the transformation $T_{Camera}^{Objecta}$. Clusters in the 6-dimensional pose space are assumed to be caused by a real object located in the corresponding pose.

In case of weak or moderate perspective, the number of different values of the parameter $\rho$ may be chosen to be very small, since length features has a $\rho$-dependence approximately equal to $\rho^{-1}$. In this case it is recommendable to let the scale-invariant descriptors determine the relevant point in the 5 dimensional $r, p, t, \phi, \theta$-space. A subsequent analysis of the scale variant descriptors then determines the relevant $\rho$-value.

The total object-camera transformation can be expressed as:

$$T_{Camera}^{Object} = [\Re(t, p, r) | O][\Re(\theta, \varphi, \pi/2) | D(\rho, \varphi, \theta)]$$

The invention claimed is:

1. A method for recognition of three dimensional objects, said one or more objects being imaged so as to provide a recognition image being a two dimensional digital image of the object, said method utilises a database in which numerical descriptors of features in a number of training images are stored, where numerical descriptors of a feature comprise:
    numerical descriptors for extrinsic properties of the feature, which numerical descriptors comprise a location and an orientation of the feature in the image, and
    numerical descriptors for intrinsic properties of the feature that are invariant to orientation of the object image, which numerical descriptors are derived after a homographic transformation applied to the feature,
said method comprising:
    performing the following elements at least partially on at least one electronic device:
        identifying features in the recognition image, each feature comprising a set of primitives;
        extracting numerical descriptors for extrinsic and intrinsic properties of the features in the recognition image;
        matching the extracted numerical descriptors with those stored in the database
        in case a match is found assign the object corresponding to the properties matched in the database to be similar to the object of the object to be recognised.

2. A method according to claim 1, for matching a recognition image with training images stored in a database, wherein the matching comprises the following steps:
    for each training image:
        determine the values of roll, tilt and pan of the transformations bringing the features of the recognition image into closer alignment with the features of the training image;
        identify clusters in the parameter space defined by the values of roll, tilt and pan determined by said transformations; and
        identify clusters having a particular intensity as corresponding to an object type and localization.

3. A method according to claim 1, wherein the database comprises for each image one or more records each representing intrinsic properties and extrinsic properties of a feature.

4. A method according to claim 3, wherein the matching comprises the steps of:
    resetting the roll, tilt and pan parameter space;
    for at least a subset of the features in the recognition image, matching properties of the recognition image with the properties stored in the database;
    in case of a match: determining roll, tilt, and pan based on the extrinsic properties from the database and from the recognition image;
    updating the parameter space; and
    testing for clustering and storing coordinates of clusters with sufficiently high density or population with an index of the training image,
    repeating the steps until all features in at least the subset of the recognition image have been matched.

5. A method according to claim 4 wherein the determinations of the roll, tilt and pan are only performed for features having similar or identical intrinsic properties compared to the intrinsic properties in the database.

6. A method according to claim 4 wherein the matching comprises selecting matching features by comparing the intrinsic descriptors of the recognition image with the intrinsic descriptors stored in the database.

7. A method according to claim 1, wherein the generation of said database comprises determination of contours, preferably level contours, and primitives in a digital image, said determination comprising the steps of:
    generating gradients of the digital image;
    finding one or more local maxima of the absolute value of the gradients;
    use the one or more local maxima as seeds for generating contours, the generation of the contours for each seed comprising determining an ordered list of points representing positions in the digital image and belonging to a contour;
    for all of said positions determining a curvature of the contours;
    from the determined curvatures determine primitives.

8. A method according to claim 7 further comprising the step of eliminating potential seed points identified near already defined contours.

9. A method according to claim 7, wherein the generation of the contours comprises assigning the list of points representing positions in the digital image, each point having a value being assigned to be common with the value of the seed.

10. A method according to claim 7, wherein the generation of the contours comprises assigning the list of points following in each point the direction of the maximum or minimal gradient detected perpendicular to a contour direction.

11. A method according to claim 7, wherein the generation of the contours comprises assigning the list of points with values above or below the value of the seed and one or more neighbour pixels with a value below or above said value of the seed.

12. A method according to claim 7, wherein the list of pixels is established by moving through the digital image in a predetermined manner.

13. A method according to claim 8, wherein the contours being are determined from an interpolation based on the list of pixels.

14. A method according to claim 8 wherein the list is an ordered list of pixels.

15. A method according to claim 7, wherein the gradients are determined by calculating the difference between numerical values assigned to neighbouring pixels.

16. A method according to claim 7, wherein the gradients are stored in an array in which each element corresponds to a specific position in the first image and a numerical value representing the value of the gradient of the first image's tones in the specific position.

17. A method according to claim 7, wherein the curvatures being established as K=dθ/ds where θ is the tangent direction at a point on a contour and s is the arc length measured from a reference point.

18. A method according to claim 7, wherein the primitives comprise at least one of
  segments of straight lines,
  segments of relatively large radius circles,
  inflection points,
  points of maximum numerical value of the curvature,
  points separating portions of very low and very high numerical value of the curvature, and
  small area entities enclosed by a contour.

19. A method according to claim 7, wherein each contour is searched for one or more of the following primitives:
  inflection point, being a region of or a point on the contour having values of the absolute value of the curvature being higher than a predefined particular level;
  concave corner, being a region of or a point on the contour having positive peaks of curvature;
  convex corner, being a region of or a point on the contour having negative peaks of curvature;
  straight segment, being segments of the contour having zero curvature; and
  circular segments, being segments of the contour having constant curvature.

20. A method of generating a database for object recognition comprising:
  performing the following elements at least partially on at least one electronic device:
    determining the primitives in a two dimensional digital image of an object, the determination comprising:
      generating the gradients of the digital image;
      finding one or more local maxima of the absolute value of the gradients;
      use the one or more local maxima as seeds for generating contours, the generation of the contours for each seed comprising determining an ordered list of points representing positions in the digital image and belonging to a contour;
      determining the curvature for at least a subset of the positions; and
      determining primitives from the determined curvatures;
    identifying features, in a number of digital images of one or more objects, each feature comprising a set of primitives;
    extracting and storing in the database numerical descriptors of the features, said numerical descriptors comprising:
      numerical descriptors for extrinsic properties of the feature, which numerical descriptors comprise a location and an orientation of the feature in the image, and
      numerical descriptors for intrinsic properties of the feature that are invariant to orientation of the object image, which numerical descriptors are derived after a homographic transformation applied to the feature.

21. A method according to claim 20 further comprising the step of eliminating potential seed points identified near already defined contours.

22. A method according to claim 20, wherein the generation of the contours comprises assigning the list of points representing positions in the digital image, each point having a value being assigned to be common with the value of the seed.

23. A method according to claim 20, wherein the generation of the contours comprises assigning the list of points following in each point the direction of the maximum or minimal gradient detected perpendicular to a contour direction.

24. A method according to claim 20, wherein the generation of the contours comprises assigning the list of points with values above or below the value of the seed and one or more neighbour pixels with a value below or above said value of the seed.

25. A method according to claim 20, wherein the list of pixels is established by moving through the digital image in a predetermined manner.

26. A method according to claim 21, wherein the contours being determined from an interpolation based on the list of pixels.

27. A method according to claim 21 wherein the list is an ordered list of pixels.

28. A method according to claim 20, wherein the gradients are determined by calculating the difference between numerical values assigned to neighbouring pixels.

29. A method according to claim 20, wherein the gradients are stored in an array in which each element corresponds to a specific position in the first image and a numerical value representing the value of the gradient of the first image's tones in the specific position.

30. A method according to claim 20, wherein the curvatures being established as x=dθ/ds where θ is the tangent direction at a point on a contour and s is the arc length measured from a reference point.

31. A method according to claim 20, wherein the primitives comprise at least one of:
  segments of straight lines,
  segments of relatively large radius circles,
  inflection points,
  points of maximum numerical value of the curvature, said points being preferably assigned to be corners,
  points separating portions of very low and very high numerical value of the curvature, and
  small area entities enclosed by a contour.

32. A method according to claim 20, wherein each contour is searched for one or more of the following primitives:
  inflection point, being a region of or a point on the contour having values of the absolute value of the curvature being higher than a particular level;
  concave corner, being a region of or a point on the contour having positive peaks of curvature;
  convex corner, being a region of or a point on the contour having negative peaks of curvature;
  straight segment, being segments of the contour having zero curvature; and
  circular segments, being segments of the contour having constant curvature.

33. A method according to claim 1, wherein the extrinsic properties comprises a reference point and a reference direction.

34. A method according to claim 1, wherein the intrinsic properties comprises numerical quantities of features.

35. A method according to claim 1, wherein the object being imaged by at least two imaging devices thereby generating at least two recognition images of the object and wherein the method according to claim 1 is applied to each recognition image and wherein the matches found for each recognition image are compared.

36. A method according to claim 35, where the method comprises:
   for each imaging device, providing an estimate for the three dimensional reference point of the object,
   for each imaging device, calculating a line from the imaging device pinhole to the estimated reference point,
   and when at least two or more lines have been provided,
   discarding the estimates in the case that the said two or more lines do not essentially intersect in three dimensions,
   and when the said two or more lines essentially intersect,
   estimating a global position of the reference point based on the pseudo intersection between the lines obtained from each imaging device.

37. The method of claim 1, wherein the primitives comprise a point on, a segment of, or an area enclosed by, a contour of an image.

38. The method of claim 20, wherein the primitives comprise a point on, a segment of, or an area enclosed by, a contour of an image.

* * * * *

UNITED STATES PATENT AND TRADEMARK OFFICE
CERTIFICATE OF CORRECTION

PATENT NO. : 7,822,264 B2  Page 1 of 1
APPLICATION NO. : 10/568268
DATED : October 26, 2010
INVENTOR(S) : Balslev et al.

It is certified that error appears in the above-identified patent and that said Letters Patent is hereby corrected as shown below:

| Column | Line | Description of Error |
|---|---|---|
| Cover Page 1 Col. 2 (Assistant Examiner) | 1 | Change "Aklilu" to --Akililu--. |
| 1 | 56 | Change "In" to --in--. |
| 6 | 16 | Change "In" to --in--. |
| 10 | 24 | Change "Image" to --image--. |
| 11 | 38 | Change "Interpolation." to --interpolation.--. |
| 13 | 15 | Change "In" to --in--. |
| 15 | 63 | Change "fulfillment" to --fulfilment--. |
| 18 | 21 | Change "R." to --$R_Z$.--. |
| 21 | 19 | In Claim 18, after "one of" insert --:--. |
| 21 | 31 | In Claim 19, after "higher than a" delete "predefined". |
| 21 | 58 | In Claim 20, change "features," to --features--. |

Signed and Sealed this
Twelfth Day of April, 2011

David J. Kappos
*Director of the United States Patent and Trademark Office*